US007095015B2

(12) United States Patent
Bateman et al.

(10) Patent No.: US 7,095,015 B2
(45) Date of Patent: Aug. 22, 2006

(54) MASS SPECTROMETER

(75) Inventors: Robert Harold Bateman, Knutsford (GB); Martin Green, Altrincham (GB)

(73) Assignee: Micromass UK Limited, Manchester (GB)

( * ) Notice: Subject to any disclaimer, the term of this patent is extended or adjusted under 35 U.S.C. 154(b) by 581 days.

(21) Appl. No.: 10/274,988

(22) Filed: Oct. 22, 2002

(65) Prior Publication Data

US 2003/0075678 A1 Apr. 24, 2003

Related U.S. Application Data

(60) Provisional application No. 60/411,822, filed on Sep. 19, 2002.

(30) Foreign Application Priority Data

| | | |
|---|---|---|
| Oct. 22, 2001 | (GB) | 0125241 |
| Nov. 19, 2001 | (GB) | 0127662 |
| Sep. 17, 2002 | (GB) | 0221502 |

(51) Int. Cl.
*B01D 59/44* (2006.01)
*H01J 49/00* (2006.01)

(52) U.S. Cl. ....................... 250/288; 250/281; 250/292; 250/287

(58) Field of Classification Search ................. 250/288, 250/281, 292, 287
See application file for complete search history.

(56) References Cited

U.S. PATENT DOCUMENTS

| | | | |
|---|---|---|---|
| 5,986,258 | A | 11/1999 | Park |
| 6,011,259 | A | 1/2000 | Whitehouse et al. |
| 6,040,575 | A | 3/2000 | Whitehouse et al. |
| 6,080,985 | A | 6/2000 | Welkie et al. |
| 6,661,001 | B1 | 12/2003 | Park |
| 2003/0066958 | A1 | 4/2003 | Okumura et al. |

FOREIGN PATENT DOCUMENTS

| | | | |
|---|---|---|---|
| DE | 100 37 859 | A1 | 3/2002 |
| EP | 0 266 039 | | 8/1987 |
| EP | 1 215 711 | A2 | 11/2001 |
| EP | 1 302 973 | A2 | 4/2003 |
| GB | 2 306 766 | A | 5/1997 |
| GB | 2 369 721 | A | 6/2002 |
| JP | 2000251831 | | 9/2000 |
| JP | 2000-251831 | | 9/2000 |
| WO | WO 98/06481 | | 2/1998 |
| WO | WO 98/33203 | | 7/1998 |

OTHER PUBLICATIONS

He et al., "Detection of Oligonucleotides by External Injection into an Ion Trap Storage/Reflectron Time–of–Flight Device", Rapid Communications in Mass Spectrometry, vol. 11, pp. 140–1448, 1997.

(Continued)

*Primary Examiner*—Nikita Wells
*Assistant Examiner*—Erin-Michael Gill
(74) *Attorney, Agent, or Firm*—Diederiks & Whitelaw, PLC

(57) ABSTRACT

A mass spectrometer is disclosed wherein the pusher electrode of a Time of Flight mass analyser is operated in conjunction with an ion gate to ensure that low mass background or matrix ions are not injected into the drift region of the mass analyser.

51 Claims, 17 Drawing Sheets

OTHER PUBLICATIONS

Dedman t et al., "An Ion Gating, Bunching, and Potential Re–Referencing Unit", Review of Scientific Instruments, vol. 72, No. 7, pp. 2915–2922, 2001.

Hang et al., "Selective Removal of Matrix Ion Peaks in Plasma Source Time–of–Flight Mass Spectrometry: Ion Deflection and Detector Gating", Journal of Analytical Atomic Spectroscopy, vol. 14, pp. 1523–1526, 1999.

Hanson et al., "Selective Background Suppression in MALDI–TOF Mass Spectrometry", Analytical Chemistry, vol. 66, No. 21, pp. 3676–3680, 1994.

Limberg et al., "Quantification of the Amount of Galacturonic Acid Residues in Blocksequences in Pectin Homogalacturonan by Enzymatic Fingerprinting With Exo–and Endo–Polygalacturonase II From *Apergillus Niger*", www.elsevier.nl/locate/carres, Carbohydrate Research, vol. 327, No. 3, pp. 321–332, Jul. 24, 2000.

MASS SPECTROMETER

CROSS-REFERENCE TO RELATED APPLICATIONS

The present application claims the benefit of U.S. Provisional Application No. 60/411,822 filed Sep. 19, 2002.

BACKGROUND OF THE INVENTION

1. Field of the Invention

The present invention relates to a mass spectrometer.

2. Discussion of the Prior Art

A common problem with known mass spectrometers is that the largest ions in a mass spectrum may originate from chemical species (i.e. background ions) which are of no interest to the analysis. For example, the background ions may comprise solvent ions, Gas Chromatograph carrier gas ions, Chemical Ionisation reagent gas ions or air peaks from vacuum leaks. These background ions can give rise to large ion signals which unless attenuated may saturate the ion detector thereby affecting the integrity of the mass spectra produced and reducing the lifetime of the ion detector.

It is therefore desired to provide an improved mass spectrometer.

SUMMARY OF THE INVENTION

According to a first aspect of the present invention there is provided a mass spectrometer comprising:

an ion source;

an orthogonal acceleration Time of Flight mass analyser comprising an electrode for orthogonally accelerating ions, an ion detector and a drift region therebetween;

an ion gate upstream of the electrode; and control means for switching the ion gate between a first mode and a second mode, the second mode having a lower ion transmission efficiency than the first mode, wherein in a mode of operation the control means:

(i) switches the ion gate from the first mode to the second mode at a time $T_1$; and (ii) causes the electrode to inject or orthogonally accelerate ions into the drift region at a later time $T_1+\Delta T_1$;

wherein $\Delta T_1$ is set such that ions having a mass to charge ratio $\leqq$ a value M1 are not substantially injected or orthogonally accelerated into the drift region by the electrode.

An advantage of the preferred embodiment is that the ion signal from intense low mass to charge ratio ions can be prevented from reaching the ion detector reducing the possibility of detector saturation and increasing the lifetime of the detector.

Preferably, ions having a mass to charge ratio $\geqq$ a value M1' are substantially injected or orthogonally accelerated into said drift region by said electrode with a first transmission efficiency and ions having a mass to charge ratio in the range M1–M1' are substantially injected or orthogonally accelerated into said drift region by said electrode with a second transmission efficiency lower than said first transmission efficiency, wherein M1<M1'.

Preferably, M1' falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

After the ion gate has been switched from the first (ON) mode to the second (OFF) mode the pusher electrode is then energised after a delay time $\Delta T_1$, wherein $\Delta T_1$ preferably falls within a range selected from the group consisting of: (i) 0.1–1 μs; (ii) 1–5 μs; (iii) 5–10 μs; (iv) 10–15 μs; (v) 15–20 μs; (vi) 20–50 μs; (vii) 50–100 μs; (viii) 100–500 μs; and (ix) 500–1000 μs.

The low mass cut-off M1 preferably falls within a range selected from the group consisting of: (i) 1–5; (ii) 5–10; (iii) 10–15; (iv) 15–20; (v) 20–25; (vi) 25–30; (vii) 30–35; (viii) 35–40; (ix) 40–45; (x) 45–50; (xi) 50–55; (xii) 55–60; (xiii) 60–65; (xiv) 65–70; (xv) 70–75; (xvi) 75–100; (xvii) 100–150; (xviii) 150–200; (xix) 200–250; (xx) 250–300; (xxi) 300–350; (xxii) 350–400; (xxiii) 400–450; (xxiv) 450–500; (xxv) 500–550; (xxvi) 550–600; (xxvii) 600–650; (xxviii) 650–700; (xxix) 700–750; (xxx) 750–800; (xxxi) 800–850; (xxxii) 850–900; (xxxiii) 900–950; (xxxiv) 950–1000; and (xxxv) >1000.

Further preferably M1 is selected from the group consisting of: (i) 4; (ii) 17; (iii) 18; (iv) 28; (v) 29; (vi) 40; (vii) 41; (viii) 93; (ix) 139; (x) 185; (xi) 379; and (xii) 568.

Preferably, immediately after said control means has caused said electrode to inject or orthogonally accelerate ions into said drift region at time $T_1+\Delta T_1$ said control means switches said ion gate from said second mode to said first mode.

According to a second aspect of the present invention, there is provided a mass spectrometer comprising:

an ion source;

an orthogonal acceleration Time of Flight mass analyser comprising an electrode for orthogonally accelerating ions, an ion detector and a drift region therebetween;

an ion gate upstream of the electrode; and control means for switching the ion gate between a first mode and a second mode, the second mode having a lower ion transmission efficiency than the first mode, wherein in a mode of operation the control means:

(i) switches the ion gate from the second mode to the first mode at a time $T_2$; and (ii) causes the electrode to inject or orthogonally accelerate ions into the drift region at a later time $T_2+\Delta T_2$;

wherein $\Delta T_2$ is set such that ions having a mass to charge ratio $\geqq$ a value M3 are not substantially injected or orthogonally accelerated into the drift region by the electrode.

The embodiment enables high mass to charge ratio ions to be excluded from being orthogonally accelerated or otherwise injected into the drift region of the Time of Flight mass analyser.

Preferably, ions having a mass to charge ratio $\leqq$ a value M3' are substantially injected or orthogonally accelerated into said drift region by said electrode with a first transmission efficiency and ions having a mass to charge ratio in the range M3'–M3are substantially injected or orthogonally accelerated into said drift region by said electrode with a second transmission efficiency lower than said first transmission efficiency, wherein M3'>M3.

Preferably, M3' falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

The ion gate is switched from the second (OFF) mode to the first (ON) mode and then after a delay time $\Delta T_2$ the pusher electrode is energised. $\Delta T_2$ preferably falls within a range selected from the group consisting of: (i) 0.1–1 μs; (ii) 1–5 μs; (iii) 5–10 μs; (iv) 10–15 μs; (v) 15–20 μs; (vi) 20–50 μs; (vii) 50–100 μs; (viii) 100–500 μs; and (ix) 500–1000 μs.

The high mass to charge ratio cut-off M3 preferably falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

Preferably, immediately after said control means has caused said electrode to inject or orthogonally accelerate ions into said drift region at time $T_2+\Delta T_2$ said control means switches said ion gate from said first mode to said second mode.

According to a third aspect of the present invention, there is provided a mass spectrometer comprising:

an ion source;

an orthogonal acceleration Time of Flight mass analyser comprising an electrode for orthogonally accelerating ions, an ion detector and a drift region therebetween;

an ion gate upstream of the electrode; and control means for switching the ion gate between a first mode and a second mode, the second mode having a lower ion transmission efficiency than the first mode, wherein in a mode of operation the control means:

(i) switches the ion gate from the second mode to the first mode at a time $T_3$;

(ii) switches the ion gate from the first mode to the second mode at a later time $T_3+\delta T_3$; and (iii) causes the electrode to inject or orthogonally accelerate ions into the drift region at a yet later time $T_3+\delta T_3+\Delta T_3$;

wherein $\delta T_3$ and $\Delta T_3$ are set such that ions having a mass to charge ratio ≦ a value M1 are not substantially injected or orthogonally accelerated into the drift region by the electrode and such that ions having a mass to charge ratio ≧ a value M3 are not substantially injected or orthogonally accelerated into the drift region by the electrode, wherein M1>M3.

According to this embodiment only ions within a certain bandpass are orthogonally accelerated or otherwise injected into the drift region of the Time of Flight mass analyser. This enables low mass to charge ratio background ions and high mass to charge ratio background ions to be filtered out.

Preferably, ions having a mass to charge ratio M2are substantially injected or orthogonally accelerated into said drift region by said electrode with a first transmission efficiency and other ions having a mass to charge ratio in the range M1–M3 are substantially injected or orthogonally accelerated into said drift region by said electrode with a second transmission efficiency lower than said first transmission efficiency, wherein M1<M2<M3. M2 preferably falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

According to another form of the third embodiment, ions having a mass to charge ratio in a range M1'–M3' are substantially injected or orthogonally accelerated into said drift region by said electrode with a first transmission efficiency and ions having a mass to charge ratio in the range M1–M1' and M3'–M3 are substantially injected or orthogonally accelerated into said drift region by said electrode with a second transmission efficiency lower than said first transmission efficiency, wherein M1<M1'<M3'<M3.

M1' preferably falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

M3' preferably falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

The length of time $\delta T_3$ that the ion gate remains in the first (ON) mode preferably falls within a range selected from the group consisting of: (i) 0.1–1 μs; (ii) 1–5 μs; (iii) 5–10 μs; (iv) 10–15 μs; (v) 15–20 μs; (vi) 20–50 μs; (vii) 50–100 μs; (viii) 100–500 μs; and (ix) 500–1000 μs.

The delay time $\Delta T_3$ preferably falls within a range selected from the group consisting of: (i) 0.1–1 μs; (ii) 1–5 μs; (iii) 5–10 μs; (iv) 10–15 μs; (v) 15–20 μs; (vi) 20–50 μs; (vii) 50–100 μs; (viii) 100–500 μs; and (ix) 500–1000 μs.

M1 preferably falls within a range selected from the group consisting of: (i) 1–5; (ii) 5–10; (iii) 10–15; (iv) 15–20; (v) 20–25; (vi) 25–30; (vii) 30–35; (viii) 35–40; (ix) 40–45; (x) 45–50; (xi) 50–55; (xii) 55–60; (xiii) 60–65; (xiv) 65–70; (xv) 70–75; (xvi) 75–100; (xvii) 100–150; (xviii) 150–200; (xix) 200–250; (xx) 250–300; (xxi) 300–350; (xxii) 350–400; (xxiii) 400–450; (xxiv) 450–500; (xxv) 500–550; (xxvi) 550–600; (xxvii) 600–650; (xxviii) 650–700; (xxix) 700–750; (xxx) 750–800; (xxxi) 800–850; (xxxii) 850–900; (xxxiii) 900–950; (xxxiv) 950–1000; and (xxxv) >1000.

M3 preferably falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

According to a fourth aspect of the present invention, there is provided a mass spectrometer comprising:

an ion source;

an orthogonal acceleration Time of Flight mass analyser comprising an electrode for orthogonally accelerating ions, an ion detector and a drift region therebetween;

an ion gate upstream of said electrode; and control means for switching said ion gate between a first mode and a second mode, said second mode having a lower ion transmission efficiency than said first mode, wherein in a mode of operation said control means:

(i) switches said ion gate from said first mode to said second mode at a time $T_4$;

(ii) switches said ion gate from said second mode to said first mode at a later time $T_4+\delta T_4$ ; and (iii) causes said electrode to inject or orthogonally accelerate ions into said drift region at a yet later time $T_4+\delta T_4+\Delta T_4$ ;

wherein $\delta T_4$ and $\Delta T_4$ are set such that ions having a mass to charge ratio equal to a value M2 are not substantially injected or orthogonally accelerated into said drift region by said electrode.

Preferably, M2 falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

Preferably, ions having a mass to charge ratio ≦ a value M1 and ions having a mass to charge ratio a value M3 are substantially injected or orthogonally accelerated into said drift region by said electrode with a first transmission efficiency, and wherein ions having a mass to charge in the range M1–M3 are substantially injected or orthogonally accelerated into said drift region by said electrode with a second transmission efficiency lower than said first transmission efficiency, wherein M1>M2>M3.

According to a fifth aspect of the present invention, there is provided a mass spectrometer comprising:

an ion source;

an orthogonal acceleration Time of Flight mass analyser comprising an electrode for orthogonally accelerating ions, an ion detector and a drift region therebetween;

an ion gate upstream of said electrode; and control means for switching said ion gate between a first mode and a second mode, said second mode having a lower ion transmission efficiency than said first mode, wherein in a mode of operation said control means:

(i) switches said ion gate from said first mode to said second mode at a time $T_4$;

(ii) switches said ion gate from said second mode to said first mode at a later time $T_4+\delta T_4$; and (iii) causes said electrode to inject or orthogonally accelerate ions into said drift region at a yet later time $T_4+\delta T_4+\Delta T_4$;

wherein $\delta T_4$ and $\Delta T_4$ are set such that ions having a mass to charge ratio in a range M1'–M3' are not substantially injected or orthogonally accelerated into said drift region by said electrode, wherein M1'<M3'.

Preferably, M1' falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

Preferably, M3' falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

Preferably, ions having a mass to charge ratio ≦ a value M1 and ions having a mass to charge ratio ≧ a value M3 are substantially injected or orthogonally accelerated into said drift region by said electrode with a first transmission efficiency and ions having a mass to charge ratio in the range M1–M1' and ions having a mass to charge ratio in the range M3'–M3 are substantially injected or orthogonally accelerated into said drift region by said electrode with a second transmission efficiency lower than said first transmission efficiency, wherein M1<M1'<M3'<M3.

Preferably, M1 falls within a range selected from the group consisting of: (i) 1–5; (ii) 5–10; (iii) 10–15; (iv) 15–20; (v) 20–25; (vi) 25–30; (vii) 30–35; (viii) 35–40; (ix) 40–45; (x) 45–50; (xi) 50–55; (xii) 55–60; (xiii) 60–65; (xiv) 65–70; (xv) 70–75; (xvi) 75–100; (xvii) 100–150; (xviii) 150–200; (xix) 200–250; (xx) 250–300; (xxi) 300–350; (xxii) 350–400; (xxiii) 400–450; (xxiv) 450–500; (xxv) 500–550; (xxvi) 550–600; (xxvii) 600–650; (xxviii) 650–700; (xxix) 700–750; (xxx) 750–800; (xxxi) 800–850; (xxxii) 850–900; (xxxiii) 900–950; (xxxiv) 950–1000; and (xxxv) >1000.

Preferably, M3 falls within a range selected from the group consisting of (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

Preferably, the period of time $\delta T_4$ that the ion gate is switched to the second (OFF) mode falls within a range selected from the group consisting of: (i) 0.1–1 μs; (ii) 1–5 μs; (iii) 5–10 μs; (iv) 10–15 us; (v) 15–20 μs; (vi) 20–50 μs; (vii) 50–100 μs; (viii) 100–500 μs; and (ix) 500–1000 μs.

Preferably, the delay time $\Delta T_4$ falls within a range selected from the group consisting of: (i) 0.1–1 μs; (ii) 1–5 μs; (iii) 5–10 μs; (iv) 10–15 μs; (v) 15–20 μs; (vi) 20–50 μs; (vii) 50–100 μs; (viii) 100–500 μs; and (ix) 500–1000 μs.

Common to all embodiments the electrode preferably comprises a pusher and/or puller electrode. The ion gate may comprise one or more electrodes for altering, deflecting, reflecting, defocusing, attenuating or blocking a beam of ions. Preferably, in said second mode said ion transmission efficiency is substantially 0% but according to a less preferred embodiment in said second mode said ion transmission efficiency is ≦x% of the ion transmission efficiency in said first mode, wherein x falls within a range selected from the group consisting of: (i) 0.001–0.01; (ii) 0.01–0.1; (iii) 0.1–1; (iv) 1–10; and (v) 10–90.

Preferably, the electrode is repeatedly energised with a frequency selected from the group consisting of: (i) 100–500 Hz; (ii) 0.5–1 kHz; (iii) 1–5 kHz; (iv) 5–10 kHz; (v) 10–20 kHz; (vi) 20–30 kHz; (vii) 30–40 kHz; (viii) 40–50 kHz; (ix) 50–60 kHz; (x) 60–70 kHz; (xi) 70–80 kHz; (xii) 80–90 kHz; (xiii) 90–100 kHz; (xiv) 100–500 kHz; (xv) 0.5–1 MHz; and (xvi) >1 MHz.

The ion source preferably comprises a continuous ion source. For example, the ion source may be selected from the group consisting of: (i) an Electron Impact ("EI") ion source; (ii) a Chemical Ionisation ("CI") ion source; (iii) a Field Ionisation ("FI") ion source; (iv) an Electrospray ion source; (v) an Atmospheric Pressure Chemical Ionisation ("APCI") ion source; (vi) an Inductively Coupled Plasma ("ICP") ion source; (vii) an Atmospheric Pressure Photo Ionisation ("APPI") ion source; (viii) a Fast Atom Bombardment ("FAB") ion source; and (ix) a Liquid Secondary Ions Mass Spectrometry ("LSIMS") ion source.

According to a less preferred embodiment the ion source is a pseudo-continuous ion source. For example, the ion source may be selected from the group consisting of: (i) a Matrix Assisted Laser Desorption Ionisation ("MALDI") ion source; and (ii) a Laser Desorption Ionisation ("LDI") ion source. Preferably, an RF ion guide comprising a collision gas for dispersing a packet of ions emitted by said ion source is provided.

The ion source may be coupled to a liquid or gas chromatography source.

According to a sixth aspect of the present invention, there is provided a method of mass spectrometry, comprising:

switching an ion gate from a first mode to a second mode at a time $T_1$, said second mode having a lower ion transmission efficiency than said first mode; and injecting or orthogonally accelerating ions into a drift region of an orthogonal acceleration Time of Flight mass analyser at a later time $T_1+\Delta T_1$;

wherein $\Delta T_1$ is set such that ions having a mass to charge ratio $\leqq$ a value M1 are not substantially injected or orthogonally accelerated into said drift region.

According to a seventh aspect of the present invention, there is provided a method of mass spectrometry, comprising:

switching an ion gate from a second mode to a first mode at a time $T_2$, said second mode having a lower ion transmission efficiency than said first mode; and injecting or orthogonally accelerating ions into a drift region of an orthogonal acceleration Time of Flight mass analyser at a later time $T_2+\Delta T_2$;

wherein $\Delta T_2$ is set such that ions having a mass to charge ratio $\geqq$ a value M3 are not substantially injected or orthogonally accelerated into said drift region.

According to an eighth aspect of the present invention, there is provided a method of mass spectrometry, comprising:

switching an ion gate from a second mode to a first mode at a time $T_3$, said second mode having a lower ion transmission efficiency than said first mode;

switching said ion gate from said first mode to said second mode at a later time $T_3+\delta T_3$; and injecting or orthogonally accelerating ions into a drift region of an orthogonal acceleration Time of Flight mass analyser at a yet later time $T_3+\delta T_3+\Delta T_3$;

wherein $\delta T_3$ and $\Delta T_3$ are set such that ions having a mass to charge ratio $\leqq$ a value M1 are not substantially injected or orthogonally accelerated into said drift region and such that ions having a mass to charge ratio $\geqq$ a value M3 are not substantially injected or orthogonally accelerated into said drift region, wherein M1<M3.

According to a ninth aspect of the present invention, there is provided a method of mass spectrometry, comprising:

switching an ion gate from a first mode to a second mode at a time $T_4$, said second mode having a lower ion transmission efficiency than said first mode;

switching said ion gate from said second mode to said first mode at a later time $T_4+\delta T_4$; and injecting or orthogonally accelerating ions into a drift region of an orthogonal acceleration Time of Flight mass analyser at a yet later time $T_4+\delta T_4+\Delta T_4$;

wherein $\delta T_4$ and $\Delta T_4$ are set such that ions having a mass to charge ratio equal to a value M2 are not substantially injected or orthogonally accelerated into said drift region.

According to a tenth aspect of the present invention, there is provided a method of mass spectrometry, comprising:

switching an ion gate from a first mode to a second mode at a time $T_4$, said second mode having a lower ion transmission efficiency than said first mode;

switching said ion gate from said second mode to said first mode at a later time $T_4+\delta T_4$; and injecting or orthogonally accelerating ions into a drift region of an orthogonal acceleration Time of Flight mass analyser at a yet later time $T_4+\delta T_4+\Delta T_4$;

wherein $\delta T_4$ and $\Delta T_4$ are set such that ions having a mass to charge ratio in a range M1'–M3' are not substantially injected or orthogonally accelerated into said drift region, wherein M1'<M3'.

In the present application where reference is made to ions having a mass to charge ratio this is intended to mean ions having a mass to charge ratio measured in units of daltons.

BRIEF DESCRIPTION OF THE DRAWINGS

Various embodiments of the present invention will now be described, by way of example only, and with reference to the accompanying drawings in which:

FIG. 13(*b*) shows a timing diagram for the second embodiment;

FIG. 13(*c*) shows a timing diagram for the third embodiment;

FIG. 13(*d*) shows a timing diagram for the fourth embodiment;

FIG. 14(*b*) shows a corresponding mass spectrum obtained conventionally;

FIG. 15(*b*) shows the same mass spectrum shown in FIG. 14(*b*) but displayed over the reduced mass to charge ratio range 15–200 daltons;

FIG. 15(*c*) shows the theoretically calculated relative transmission as a function of mass to charge ratio according to the first embodiment;

FIG. 16(*b*) shows the same mass spectrum as shown in FIG. 14(*b*) and FIG. 15(*b*) but displayed over the yet further reduced mass to charge ratio range 15–66 daltons.

DETAILED DESCRIPTION OF THE PREFERRED EMBODIMENTS

Figure 1:
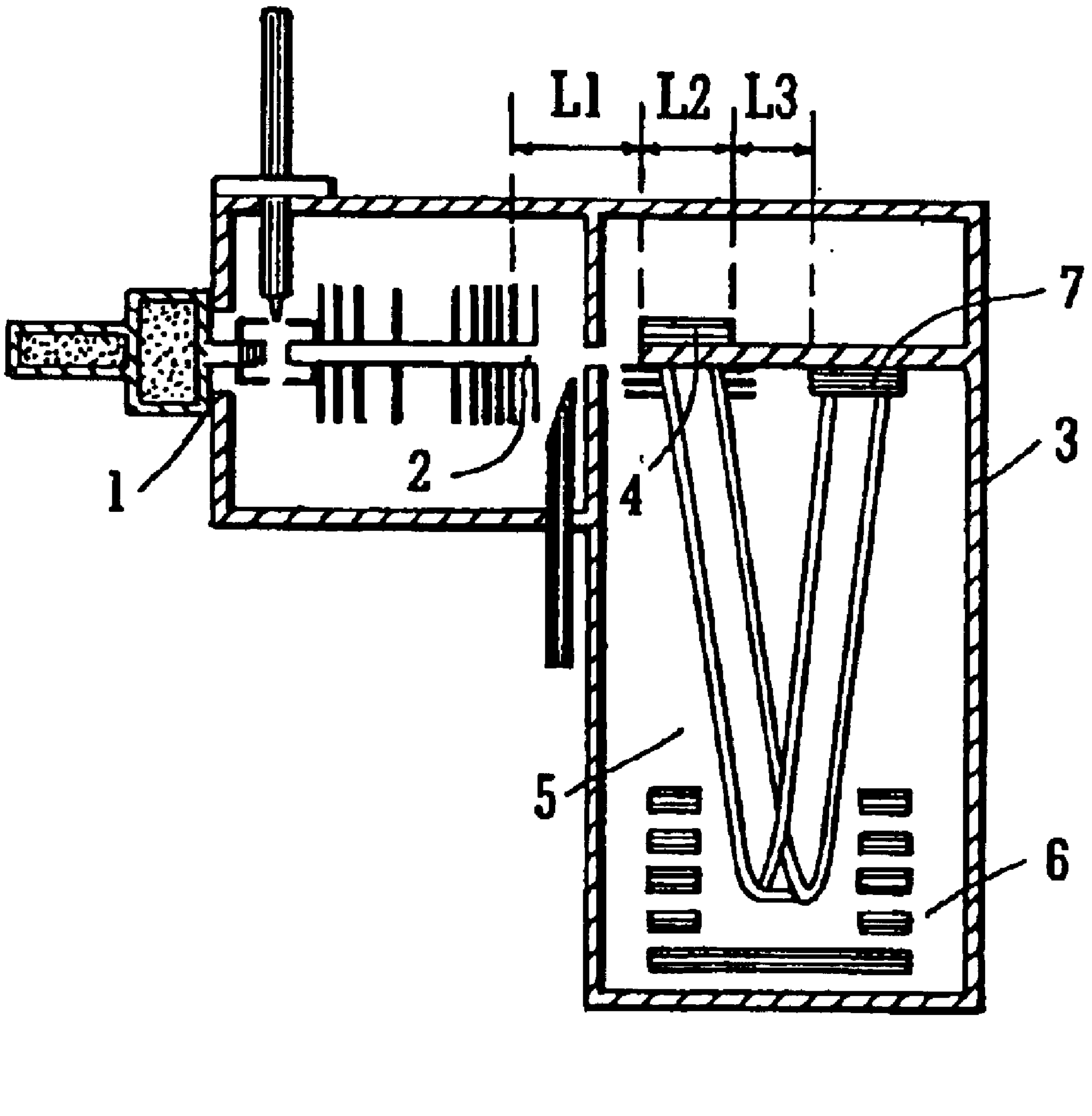
FIG. 1 shows a preferred mass spectrometer.

Various embodiments of the present invention will now be described in more detail with reference to FIG. 1. Ions emitted by an ion source 1 pass to an electrostatic device 2 arranged upstream of an acceleration chamber 3 of an orthogonal acceleration Time of Flight mass analyser. The electrostatic device 2 may comprise a single deflection electrode or more preferably a pair of electrodes arranged preferably in parallel and further preferably connected to a voltage supply. The electrostatic device 2 is preferably used to alter, deflect, reflect, defocus, attenuate or block an ion beam incident upon the device 2.

In one embodiment the electrostatic device 2 does not have any attenuating voltage applied to the device 2 when the device 2 is ON. When the device 2 is OFF a voltage is applied to device 2 in order to deflect ions. The electrostatic device 2 acts as an ion gate 2 allowing ions to be transmitted in a first (ON) mode. In a second (OFF) mode the ion gate 2 substantially reduces, preferably prevents, ions from being onwardly transmitted to the Time of Flight mass analyser.

The ion gate 2 is preferably positioned in a field free region of ion transfer optics between the ion source 1 and the orthogonal acceleration pusher electrode 4 which forms part of an orthogonal acceleration Time of Flight mass analyser. The orthogonal acceleration Time of Flight mass analyser comprises a pusher electrode 4, a drift region 5, an optional reflectron 6 and an ion detector 7. The voltage supply to the ion gate 2 is preferably capable of being switched ON/OFF in approximately 100 ns.

According to the first embodiment the ion gate 2 is set to be ON for the majority of a cycle $T_c$ so as to transmit ions. In order to discriminate against ions with low mass to charge ratios the ion gate 2 is switched to be OFF for preferably a relatively short period of time $\Delta T_1$. A short time $\Delta T_1$ after the ion gate 2 has been switched OFF a pusher voltage is applied to the orthogonal acceleration pusher electrode 4. As soon as the pusher voltage is applied the ion gate 2 is preferably switched back to ON. The ion gate 2 preferably remains ON until the beginning of the next cycle $T_c$ when it is again switched OFF. This cycle of switching the ion gate 2 ON/OFF may be repeated many times during one experimental run.

Figure 2:
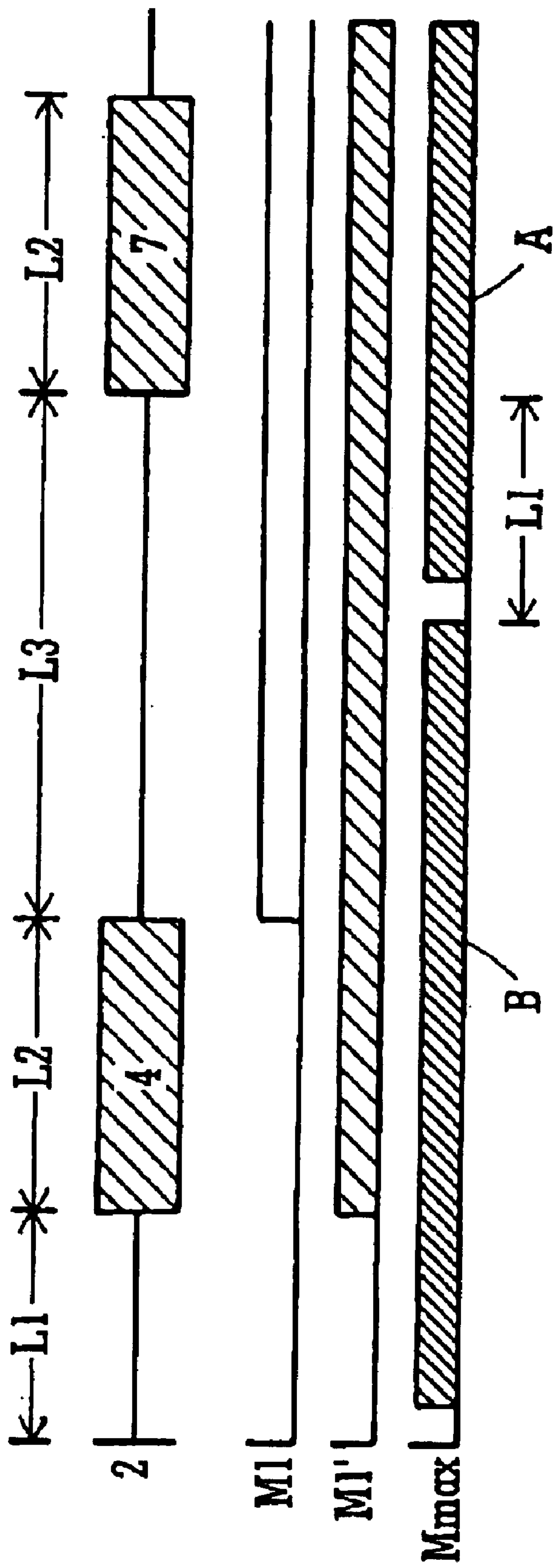
FIG. 2 illustrates a first embodiment wherein relatively low mass to charge ratio ions are prevented from reaching the ion detector.

FIG. 2 shows a schematic representation of a mode of operation of the mass spectrometer according to the first embodiment. It is assumed that a continuous ion beam is arriving at the ion gate 2. The ions transmitted by the ion gate 2 continue to the region adjacent the pusher electrode 4. The distance from the ion gate 2 to the pusher electrode 4 may be defined as L1, the length of the pusher electrode may be defined as L2 and the distance from the pusher electrode 4 to the ion detector 7 may be defined as L3. For ease of illustration only, the ion detector 7 is shown as being the same length L2 as the pusher electrode 4 although this is not relevant to the principle of operation.

Low mass to charge ratio ions having a mass to charge ratio ≦M1 have passed the pusher electrode 4 before it is energised whereas ions having a mass to charge ratio ≧M1 are disposed opposite the pusher electrode 4 and hence are orthogonally accelerated by the pusher electrode 4 into the drift region 5 of the Time of Flight mass analyser. Ions having a mass to charge ratio ≧M1' are orthogonally accelerated with a relative transmission of 100% and ions having a mass to charge ratio in the range M1–M1' are orthogonally accelerated with a relative transmission between 0% and 100%. The relative transmission is shown and explained in more detail in relation to FIG. 4.

In an orthogonal acceleration Time of Flight mass spectrometer the acceleration of ions into the drift region 5 of the Time of Flight mass analyser is orthogonal to the axial direction of the ion beam and hence the axial component of velocity of the ions remains unchanged. Therefore, the time taken for ions to pass through the drift region 5 of the Time of Flight mass analyser to the ion detector 7 is the same as the time it would have taken for the ions to have travelled the axial distance L2+L3 from the end of the pusher electrode 4 closest to the ion gate 2 to the ion detector 7 had they not been accelerated into the drift region 5.

If the maximum mass to charge ratio of ions arranged to be analysed by the mass analyser is $M_{max}$ then the cycle time $T_c$ between consecutive pulses of ions into the drift region 5 is the time required for ions of mass to charge ratio $M_{max}$ to travel the distance L2+L3 from the pusher electrode 4 to the ion detector 7. In addition to showing the positions of ions having mass to charge ratios equal to M1 and M1' at the time the pusher electrode 4 is about to be energised, FIG. 2 also shows the position of ions having a mass to charge ratio $M_{max}$ at the time the voltage is about to be applied to the pusher electrode 4. The ions are orthogonally accelerated in the drift region 5 after a delay time $\Delta T_1$ since the ion gate 2 was switched from ON to OFF.

Ions of mass to charge ratio equal to M1 have travelled the distance L1+L2 since the ion gate 2 was switched OFF and therefore ions having a mass to charge ratio M1 will not be transmitted into the drift region 5 of the Time of Flight mass analyser. Ions having a mass to charge ratio M1' have travelled the distance L1 since the ion gate 2 was switched OFF and these ions will be transmitted into the Time of Flight mass analyser with a relative transmission of 100%.

If the ions have an energy of zeV electron volts, distances are in metres, and $\Delta T_1$ is in µs, then the value of M1 in daltons is given by:

$$M1 = \frac{V \cdot \Delta T_1^2}{5184(L1 + L2)^2}$$

and the value of M1' in daltons is given by:

$$M1' = \frac{V \cdot \Delta T_1^2}{5184 L1^2}$$

hence:

$$M1' = M1 \cdot \left(1 + \frac{L2}{L1}\right)^2$$

The relative transmission Tr of ions into the drift region 5 is equal to the relative proportion of the space opposite the pusher electrode 4 occupied by ions of mass to charge ratio M. Accordingly:

$$Tr = \frac{L1 + L2 - L}{L2} \text{ or}$$

$$Tr = 1 - \frac{1}{L2} \cdot (L - L1)$$

where L is the distance travelled by ions with mass to charge M:

$$L = \frac{\Delta T_1}{72} \cdot \sqrt{\frac{V}{M}}$$

hence:

$$Tr = 1 - \frac{1}{L2} \cdot \left(\frac{\Delta T_1}{72} \cdot \sqrt{\frac{V}{M}} - L1\right)$$

Figure 3:
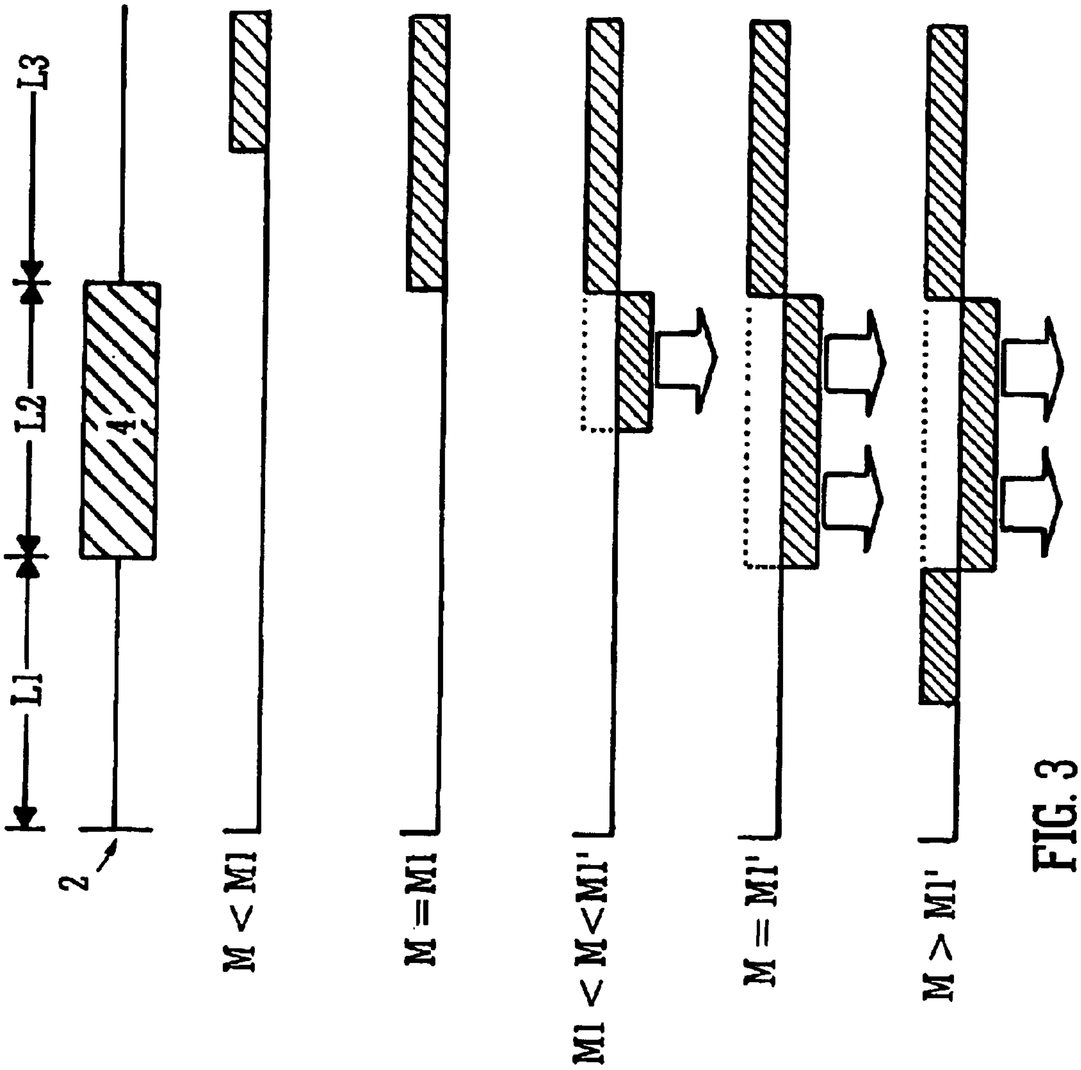
FIG. 3 illustrates ions of different mass to charge ratios adjacent the pusher electrode according to the first embodiment.

FIG. 3 is similar to FIG. 2 and shows the disposition of ions having various different mass to charge ratios at the time $T_1+\Delta T_1$ when the pusher electrode 4 is energised. Ions having a mass to charge ratio ≦M1 are not orthogonally accelerated, ions having a mass to charge ratio in the range M1–M1' are orthogonally accelerated with a relative transmission >100% and ions having a mass to charge ratio ≧M1' are orthogonally accelerated with a relative transmission of 100%.

Figure 4:
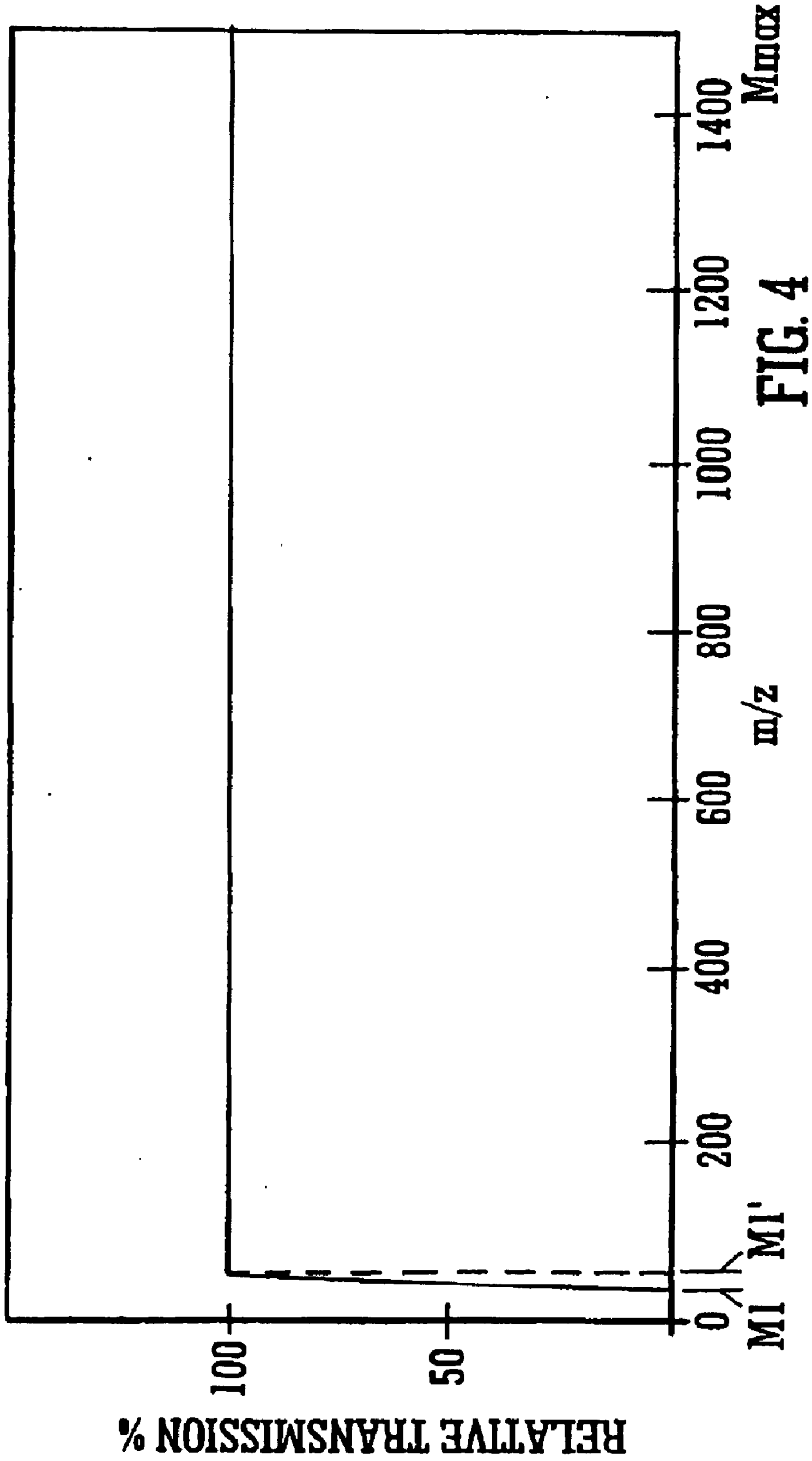
FIG. 4 shows the relative transmission of ions as a function of mass to charge ratio according to the first embodiment.

FIG. 4 shows the relative transmission as a function of mass to charge ratio according to the first embodiment for an ion energy of 90 eV, delay time $\Delta T_1$ of 6 μs and wherein L1 was 110 mm, L2 was 30 mm, L3 was 114 mm. $M_{max}$ was set to 1500 daltons. For these values M1 equals 32 daltons and M1' equals 52 daltons. Accordingly, ions having a mass to charge ratio 32 daltons are not orthogonally accelerated whereas ions having a mass to charge ratio 52 daltons are orthogonally accelerated with 100% relative transmission. Ions having a mass to charge ratio between 32 and 52 daltons are orthogonally accelerated with a relative transmission between 0% and 100%.

Any ions present with a mass to charge ratio value equal to $M_{max}$ will have a 100% relative transmission provided that the distance L1 is not greater than the distance L3. FIG. 2 shows that ions with a mass to charge ratio equal to $M_{max}$ from a first cycle A are separated from ions having the same mass to charge from a second subsequent cycle B by a small gap. This gap is due to the effect of the ion gate 2 from the previous cycle A and corresponds with the period of time when no ions are transmitted by the ion gate 2. FIG. 2 shows where this gap will exist at the time the pusher voltage is about to be applied to the pusher electrode 4. As can be seen, this gap starts a distance L1 before the ion detector 7 and accordingly if L1 is greater than L3 then the gap could appear in the region adjacent the pusher electrode 4. This would lead to a small reduction in transmission depending on the relative values of the parameters L1, L2, L3, $\Delta T_1$ and $T_c$. Any potential loss in transmission can be avoided if L1 is not greater than L3 and hence preferably the distance L1 is arranged to be less than L3.

According to the first embodiment ions having a relatively low mass to charge ratio are substantially prevented from being orthogonally accelerated in the drift region 5 of the Time of Flight mass analyser. This is particularly advantageous in a number of different situations. For example, with an Electron Impact ("EI") ion source $He^+$ ions (m/z=4) from the carrier gas for the Gas Chromatograph or $N_2^+$ ions (m/z=28) from air may be particularly intense and can advantageously be excluded according to this embodiment.

With a Chemical Ionisation ("CI") ion source using methane as the reagent gas $C_2H_5^+$ ions (m/z=29), $CH_5^+$ ions (m/z=17) and $C_3H_5^+$ ions (m/z=41) may be particularly intense and can advantageously be excluded according to this embodiment. Similarly, when using ammonia as the reagent gas $NH_4^+$ ions (m/z=18) may be particularly intense and can advantageously be excluded according to this embodiment.

The preferred embodiment is also suitable for use with other types of ion source. For example, with an ICP ion source $Ar^+$ ions (m/z=40) may be particularly intense and can be advantageously excluded according to this embodiment.

With a Matrix Assisted Laser Desorption Ionisation (AMALDI≅) ion source there are numerous different background ions which may be generated due to the various matrices used. For examples, ions having a mass to charge ratio of 379 and 568 which correspond with the dimer and trimer of the matrix alpha cyano-4-hydroxycinnamic acid can be particularly intense. Similarly, ions having a mass to charge ratio of 139 are observed when using 2,5, dihydroxybenzoic acid (DHB) as the MALDI matrix. These ions can be advantageously excluded according to either the first embodiment or according to one of the further embodiments described in more detail below.

With a Liquid Secondary Ion Mass Spectrometry (ALSIMS≅) or Fast Atom Bombardment (AFAB≅) ion source using glycerol as the matrix $C_3H_9O_3^+$ ions (m/z=93) and $C_6H_{17}O_6^+$ ions (m/z=185) can be particularly intense and may be advantageously excluded according to the first embodiment or one of the further embodiments described in more detail below.

Figure 5:
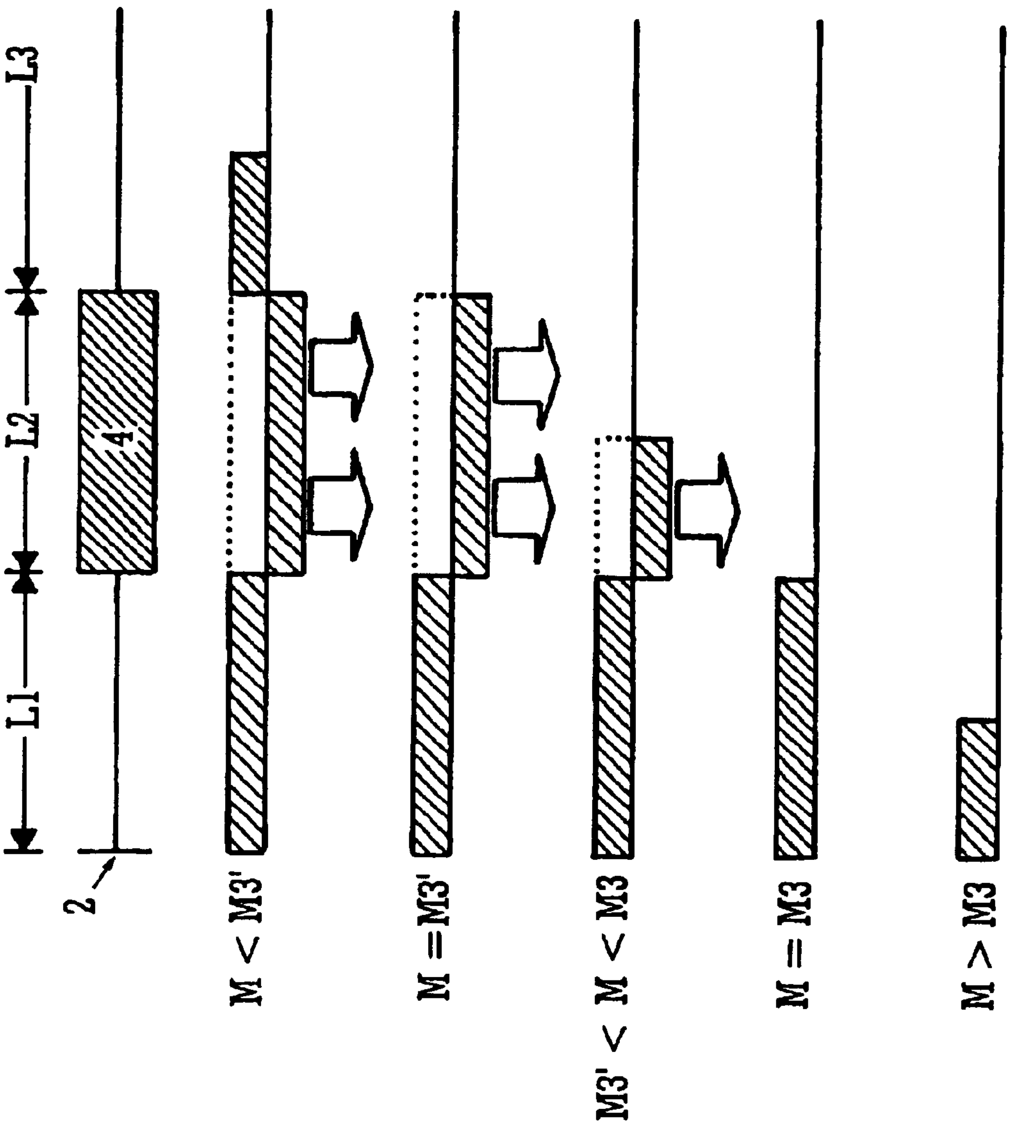
FIG. 5 illustrates a second embodiment wherein relatively high mass to charge ratio ions are prevented from reaching the ion detector.

A second embodiment wherein relatively high mass to charge ratio ions may be excluded will now be described in relation to FIG. 5. Some ion sources have a continuum of background ions extending to quite high mass to charge ratios and the background ions may in some circumstances have higher mass to charge ratios than those of the analyte ions being analysed. Such high mass to charge ratio ions may be of sufficient intensity to cause a problem with an orthogonal acceleration Time of Flight mass spectrometer. It is normally necessary with an orthogonal acceleration Time of Flight mass analyser to wait until the ions having the highest mass to charge ratios arrive at the ion detector 7 before the pusher electrode 4 is energised again to orthogonally accelerate the next bunch of ions into the drift region 5. Otherwise, high mass to charge ratio ions from a first bunch of ions may arrive at the ion detector 7 together with low mass to charge ratio ions from a subsequent second bunch of ions. These high mass to charge ratio ions would therefore contribute noise and would present artefact peaks within the resulting mass spectrum.

Also, where background ions extend to much higher mass to charge ratios than the mass to charge ratio of the analyte ions this may make it necessary to wait for relatively long periods of time between pusher electrode pulses thereby reducing the duty cycle and hence lowering the sensitivity of the mass spectrometer. Accordingly, providing a high mass cut-off mode may be particularly advantageous in that this will eliminate noise and possible artefact peaks whilst maintaining the highest possible duty cycle and sensitivity.

According to the second embodiment the ion gate 2 is set to be OFF for the majority of a cycle so as to prevent ions being transmitted. In order to discriminate against ions with relatively high mass to charge ratios the ion gate 2 is switched to be ON for preferably a relatively short period of time $\Delta T_2$. A short time $\Delta T_2$ after the ion gate 2 has been switched ON a pusher voltage is applied to the orthogonal acceleration pusher electrode 4. As soon as the pusher voltage is applied to the pusher electrode 4 the ion gate 2 is preferably switched OFF. The ion gate 2 preferably remains OFF until the beginning of the next cycle $T_c$ when it is again switched ON. This cycle of switching the ion gate 2 ON/OFF may be repeated many times during one experimental run.

Ions of mass to charge ratio M3' are those ions that have just travelled the axial distance L1+L2 since the ion gate 2 was switched ON. Accordingly, ions having a mass to charge ratio ≦M3' are orthogonally accelerated with a relative transmission of 100%.

If the ions have an energy of zeV electron volts, distances are in metres, and $\Delta T_2$ is in μs, then the value of M3' in daltons is given by:

$$M3' = \frac{V \cdot \Delta T_2^2}{5184(L1 + L2)^2}$$

and the value of M3 in daltons is given by:

$$M3 = \frac{V \cdot \Delta T_2^2}{5184 L1^2}$$

hence:

$$M3 = M3' \cdot \left(1 + \frac{L2}{L1}\right)^2$$

The relative transmission Tr of ions into the drift region 5 is equal to the relative proportion of the space opposite the pusher electrode 4 occupied by ions of mass to charge ratio M, therefore:

$$Tr = \frac{L - L1}{L2} \text{ or}$$

$$Tr = \frac{1}{L2} \cdot (L - L1)$$

where L is the distance travelled by ions with mass to charge M. Accordingly:

$$L = \frac{\Delta T_2}{72} \cdot \sqrt{\frac{V}{M}}$$

hence:

-continued $$Tr = \frac{1}{L2} \cdot \left(\frac{\Delta T_2}{72} \cdot \sqrt{\frac{V}{M}} - L1\right)$$

Figure 6:
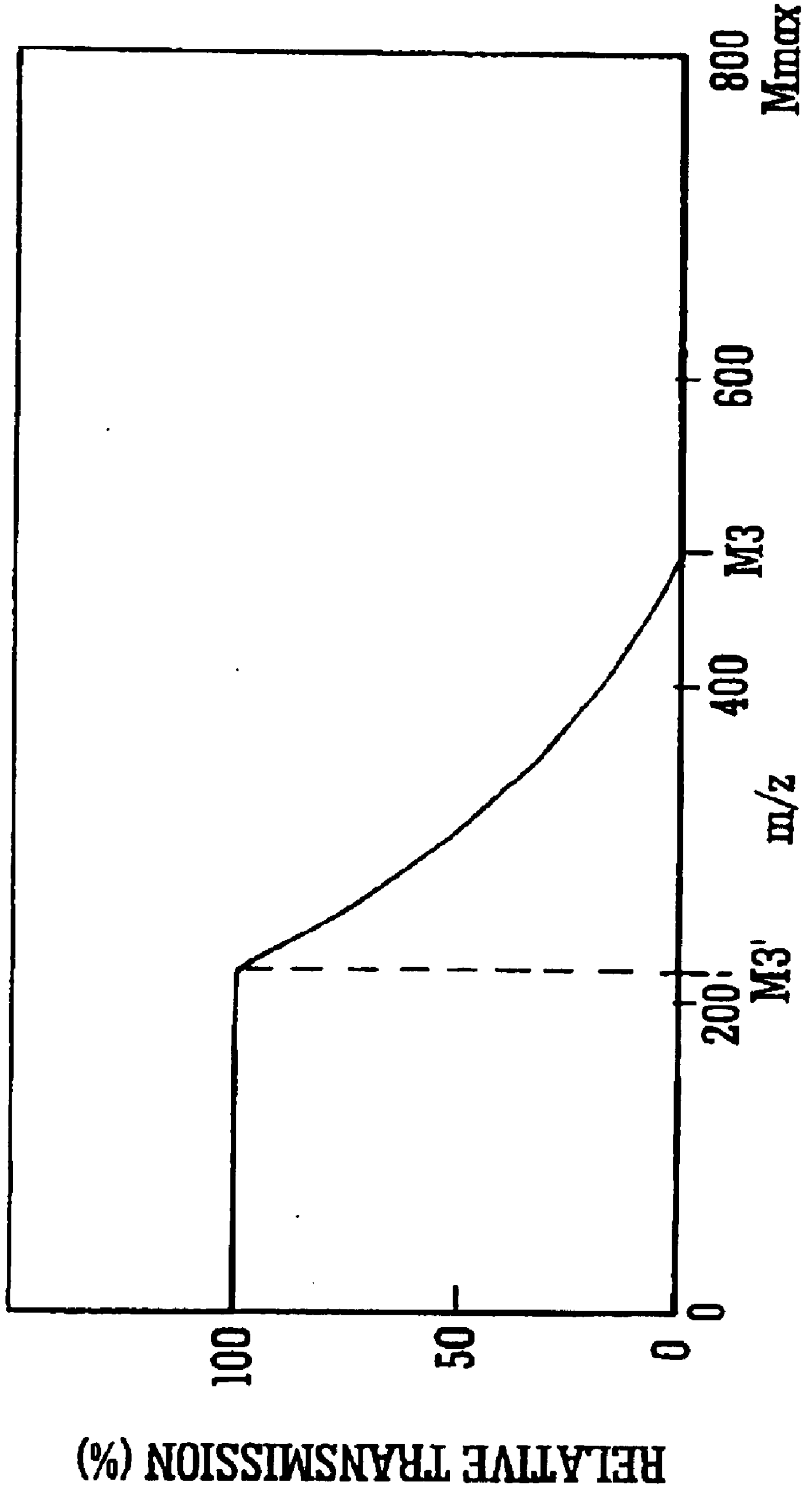
FIG. 6 shows the relative transmission of ions as a function of mass to charge ratio according to the second embodiment.

FIG. 6 shows the relative transmission as a function of mass to charge ratio according to the second embodiment for an ion energy of 40 eV, delay time $\Delta T_2$ of 15 μs and wherein L1 was 60 mm, L2 was 30 mm and L3 was 60 mm. $M_{max}$ was set to 800 daltons. For these values M3' equals 214 daltons and M3 equals 480 daltons. Accordingly, ions having a mass to charge ratio ≦214 daltons are orthogonally accelerated with a relative transmission of 100% whereas ions having a mass to charge ratio ≧480 daltons are not orthogonally accelerated. Ions having a mass to charge ratio between 214 and 480 daltons are orthogonally accelerated with a relative transmission between 0% and 100%.

The ability to be able to filter out relatively high mass to charge ratio ions is particularly advantageous with Gas Chromatograph ("GC") Mass Spectrometry where it is normally required to only analyse relatively low mass to charge ratio analyte ions, for example ions in the mass range 100–200 daltons. GC mass spectrometers can suffer from "bleed" peaks from the GC column as high as 600–1000 daltons and it can therefore be necessary to have to wait until these ions arrive before firing the next pulse. Such an approach is obviously inefficient. This wait can be eliminated by the use of the high mass cut-off method according to the second embodiment.

Fast Atom Bombardment ("FAB") and Liquid Secondary Ions Mass Spectrometry ("LSIMS") ion sources are notorious for giving a high level of background ions having very high mass to charge ratios (e.g. >3000 daltons). The second embodiment is therefore particularly suitable for use with FAB and LSIMS ion sources.

Figure 7:
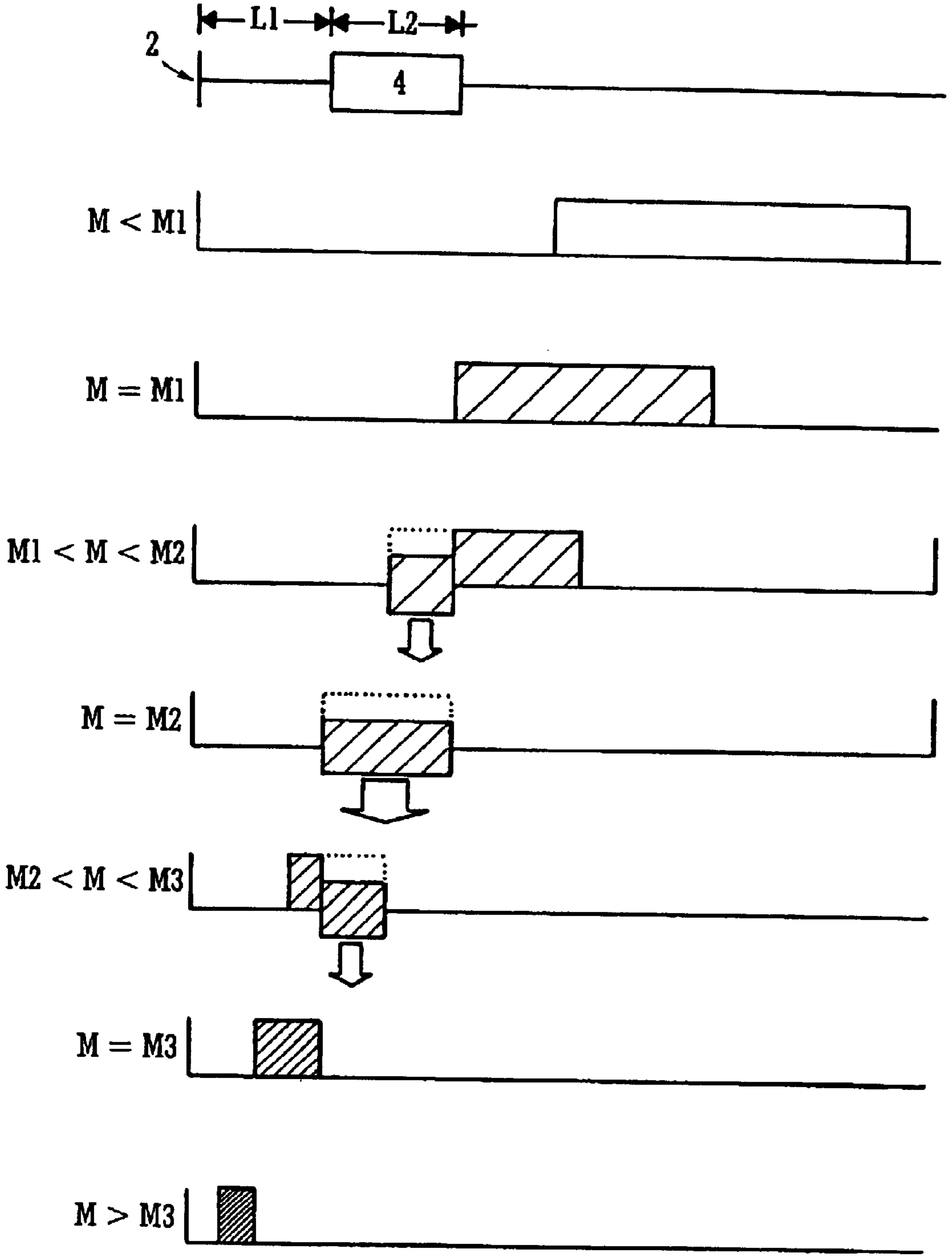
FIG. 7 illustrates a third embodiment wherein both relatively low mass to charge ratio ions and relatively high mass to charge ratio ions are prevented from reaching the ion detector.

A third embodiment relating to bandpass transmission mode of operation wherein both relatively high mass to charge ratio ions and relatively low mass to charge ratio ions are removed will now be described in relation to FIG. 7.

According to the third embodiment the ion gate 2 is set to be OFF for the majority of a cycle $T_c$ so as to prevent ions being transmitted. In order to orthogonally accelerate only ions within a bandpass range of mass to charge ratios the ion gate 2 is switched to be ON for preferably a relatively short period of time $\delta T_3$. A short time $\Delta T_3$ after the ion gate 2 has been switched back from ON to OFF a pusher voltage is applied to the orthogonal acceleration pusher electrode 4. As soon as the pusher voltage is applied the ion gate 2 preferably remains switched OFF. The ion gate 2 preferably remains OFF until the beginning of the next cycle $T_c$ when it is again switched ON for a relatively short period of time. This cycle of switching the ion gate 2 ON/OFF may be repeated many times during one experimental run.

Ions of mass to charge ratio M1 are those ions that have just travelled the axial distance L1+L2 since the ion gate 2 was switched from ON to OFF. Accordingly, ions having a mass to charge ratio ≦M1 are not orthogonally accelerated. Similarly, ions having a mass to charge ratio ≧M3 are not orthogonally accelerated. Ions having a mass to charge ratio M2 are orthogonally accelerated with a relative transmission of 100% and other ions having a mass to charge ratio within the range M1–M3 are orthogonally accelerated with a relative transmission between 0% and 100%.

Figure 8:
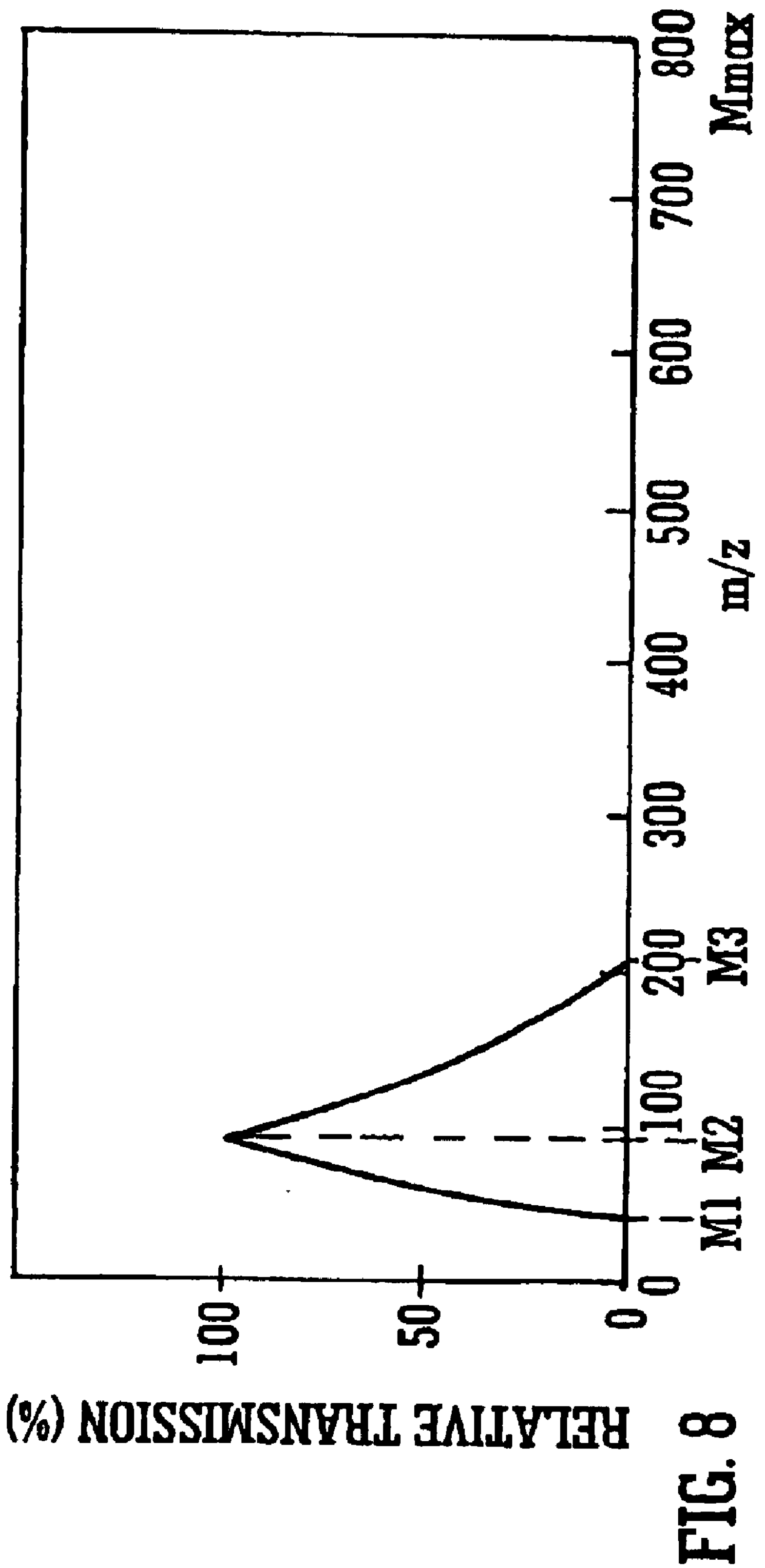
FIG. 8 shows the relative transmission of ions as a function of mass to charge ratio according to the third embodiment.

FIG. 8 shows the relative transmission as a function of mass to charge ratio according to the third embodiment for an ion energy of 40 eV, $\delta T_3$ of 3.25 μs, delay time $\Delta T_3$ of 6.5 μs and wherein L1 was 60 mm, L2 was 30 mm and L3 was 60 mm. $M_{max}$ was set to 800 daltons. For these values M1 equals 40 daltons, M2 equals 90 daltons and M3 equals 204 daltons. Accordingly, ions having a mass to charge ratio ≦40 daltons are not orthogonally accelerated and similarly ions having a mass to charge ratio ≧204 daltons are not orthogonally accelerated. Ions having a mass to charge ratio between 90 and 204 daltons are orthogonally accelerated with a relative transmission between 0% and 100%.

Figure 9:
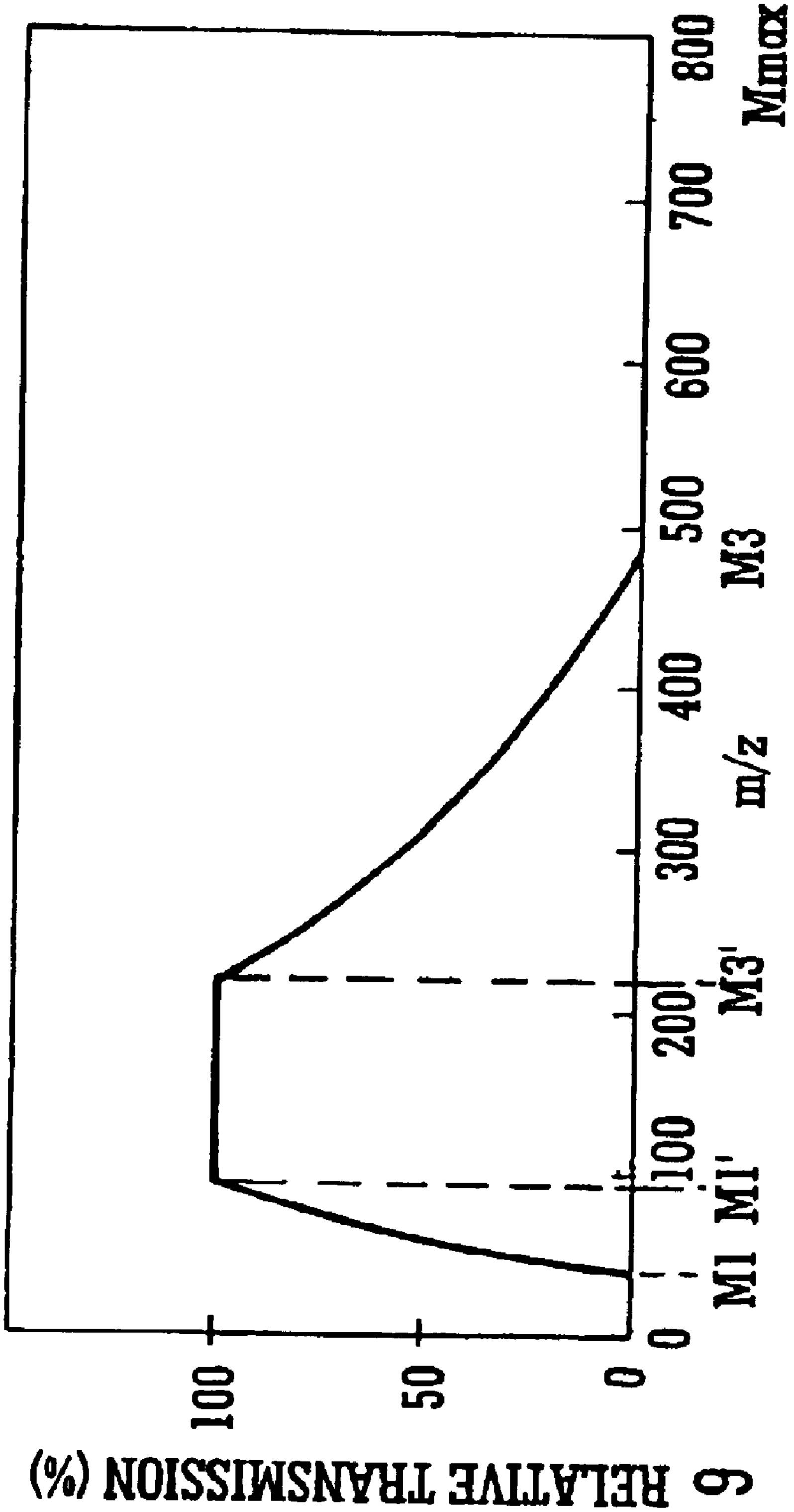
FIG. 9 shows the relative transmission of ions as a function of mass to charge ratio according to a variation of the third embodiment.

A variation of the third embodiment is contemplated wherein the range of ions orthogonally accelerated with 100% relative transmission is increased. This can be achieved by increasing the time $\delta T_3$ that the ion gate 2 is ON. This is illustrated further with reference to FIG. 9 which shows the relative transmission as a function of mass to charge ratio according to the variation of the third embodiment for an ion energy of 40 eV, $\delta T_3$ of 8.5 μs, delay time $\Delta T_3$ of 6.5 μs and wherein L1 was 60 mm, L2 was 30 mm and L3 was 60 mm. $M_{max}$ was set to 800 daltons. For these values M1 equals 40 daltons, M1' equals 90 daltons, M3' equals 214 daltons and M3 equals 480 daltons. Accordingly, ions having a mass to charge ratio ≦40 daltons are not orthogonally accelerated and similarly ions having a mass to charge ratio ≧480 daltons are not orthogonally accelerated. Ions having a mass to charge ratio between 90 and 214 daltons are orthogonally accelerated with a relative transmission of 100% and ions having a mass to charge ratio between 40 and 90 daltons and between 214 and 480 daltons are orthogonally accelerated with a relative transmission between 0% and 100%.

A mass spectrometer according to the third embodiment may be used to filter out both relatively low mass to charge ratio ions and relatively high mass to charge ratio ions as discussed above in relation to the first and second embodiments.

Figure 10:
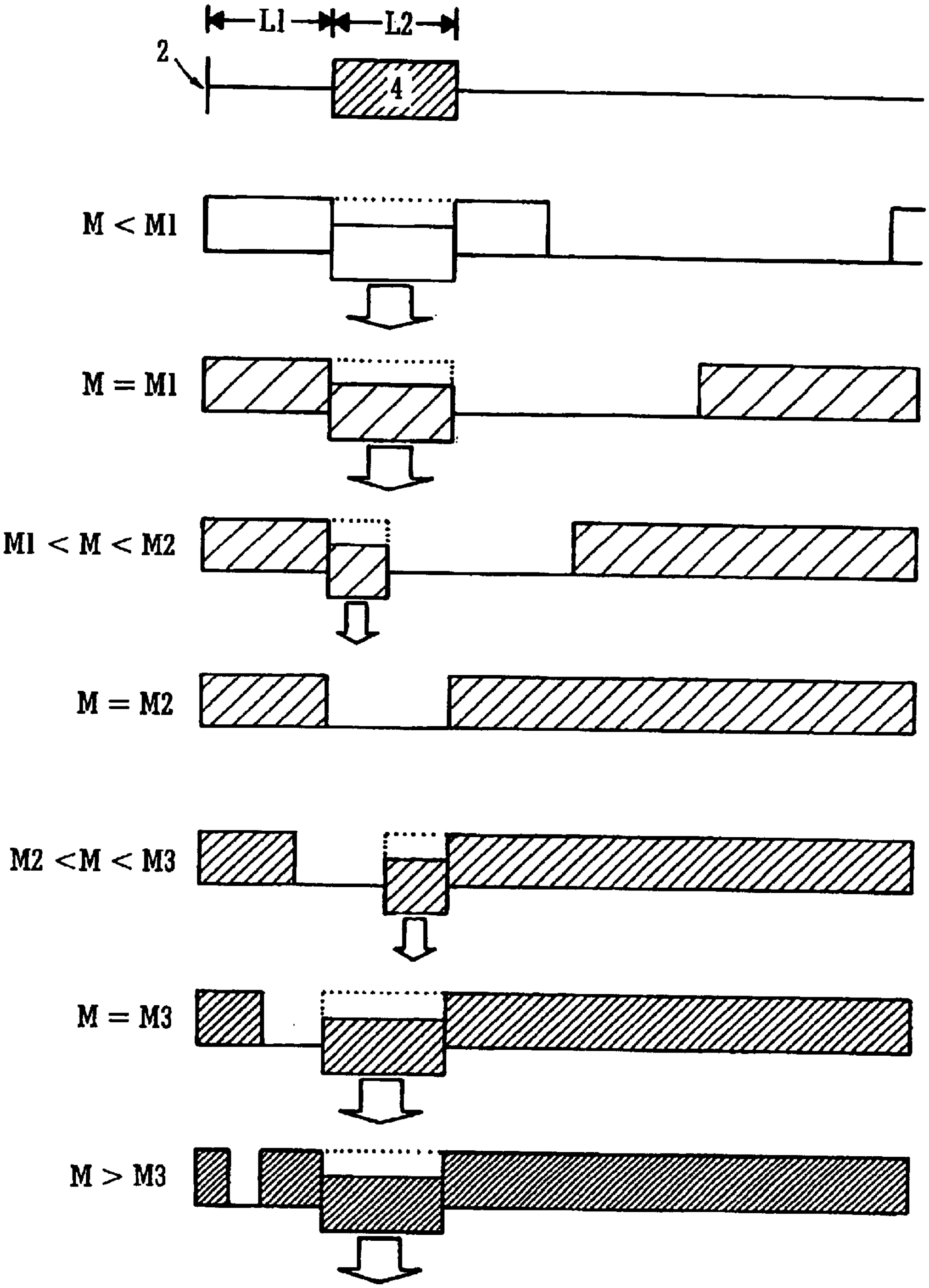
FIG. 10 illustrates a fourth embodiment wherein only ions having a relatively narrow range of mass to charge ratios are prevented from reaching the ion detector.

A fourth embodiment relating to bandpass filter mode of operation wherein only ions falling with a specific relatively narrow range of mass to charge ratios are removed will now be described in relation to FIG. 10.

According to the fourth embodiment the ion gate 2 is set to be ON for the majority of a cycle $T_c$ so as to transmit ions. In order to orthogonally accelerate ions but not those falling within a specific range of mass to charge ratios the ion gate 2 is switched to be OFF for preferably a relatively short period of time $\delta T_4$. A short time $\Delta T_4$ after the ion gate 2 has been switched back from OFF to ON a pusher voltage is applied to the orthogonal acceleration pusher electrode 4. As soon as the pusher voltage is applied the ion gate 2 preferably remains switched ON. The ion gate 2 preferably remains ON until the beginning of the next cycle $T_c$ when it is again switched OFF. This cycle of switching the ion gate 2 ON/OFF may be repeated many times during one experimental run.

Ions of mass to charge ratio M1 are those ions that have just travelled the axial distance L1+L2 since the ion gate 2 was switched from OFF to ON. Accordingly, ions having a mass to charge ratio ≦M1 are orthogonally accelerated with a relative transmission of 100%. Ions having a mass to charge ratio ≧M3 are present from the previous cycle and are also orthogonally accelerated with a relative transmission of 100%. Ions having a mass to charge ratio M2 are not orthogonally accelerated and other ions having a mass to charge ratio within the range M1–M3 are orthogonally accelerated with a relative transmission between 0% and 100%.

Figure 11:
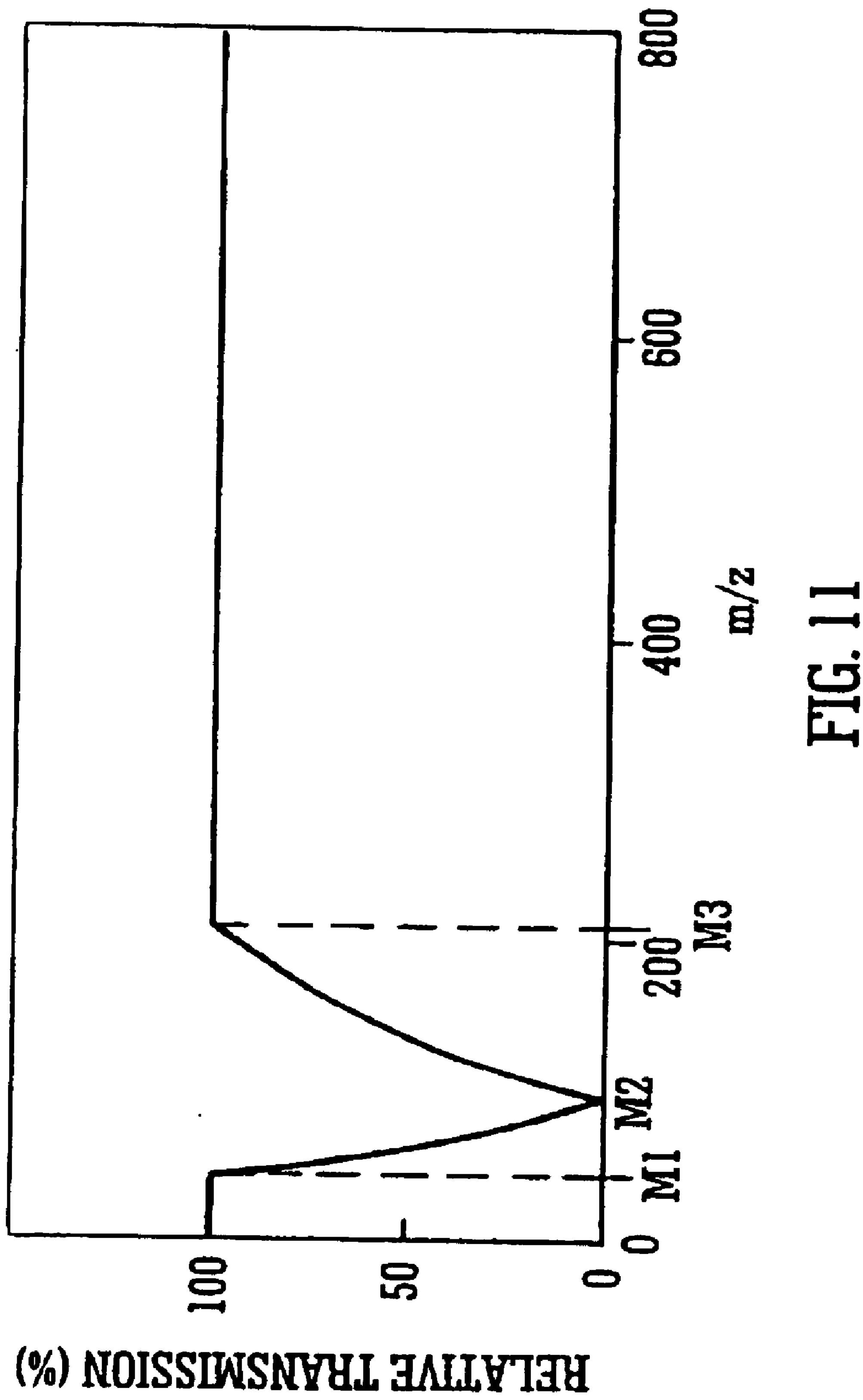
FIG. 11 shows the relative transmission of ions as a function of mass to charge ratio according to the fourth embodiment.

FIG. 11 shows the relative transmission as a function of mass to charge ratio according to the fourth embodiment for an ion energy of 40 eV, $\delta T_3$ of 3.25 μs, delay time $\Delta T_3$ of 6.5 μs and wherein L1 was 60 mm, L2 was 30 mm and L3 was 60 mm. $M_{max}$ was set to 800 daltons. For these values M1 equals 40 daltons, M2 equals 90 daltons and M3 equals 204 daltons. Accordingly, ions having a mass to charge ratio ≦40 daltons are orthogonally accelerated with 100% relative transmission and similarly ions having a mass to charge ratio ≧204 daltons are orthogonally accelerated with 100% relative transmission. Ions having a mass to charge ratio between 90 and 204 daltons are orthogonally accelerated with a relative transmission between 0% and 100%, and ions having a mass to charge ratio of 90 daltons are not orthogonally accelerated.

Figure 12:
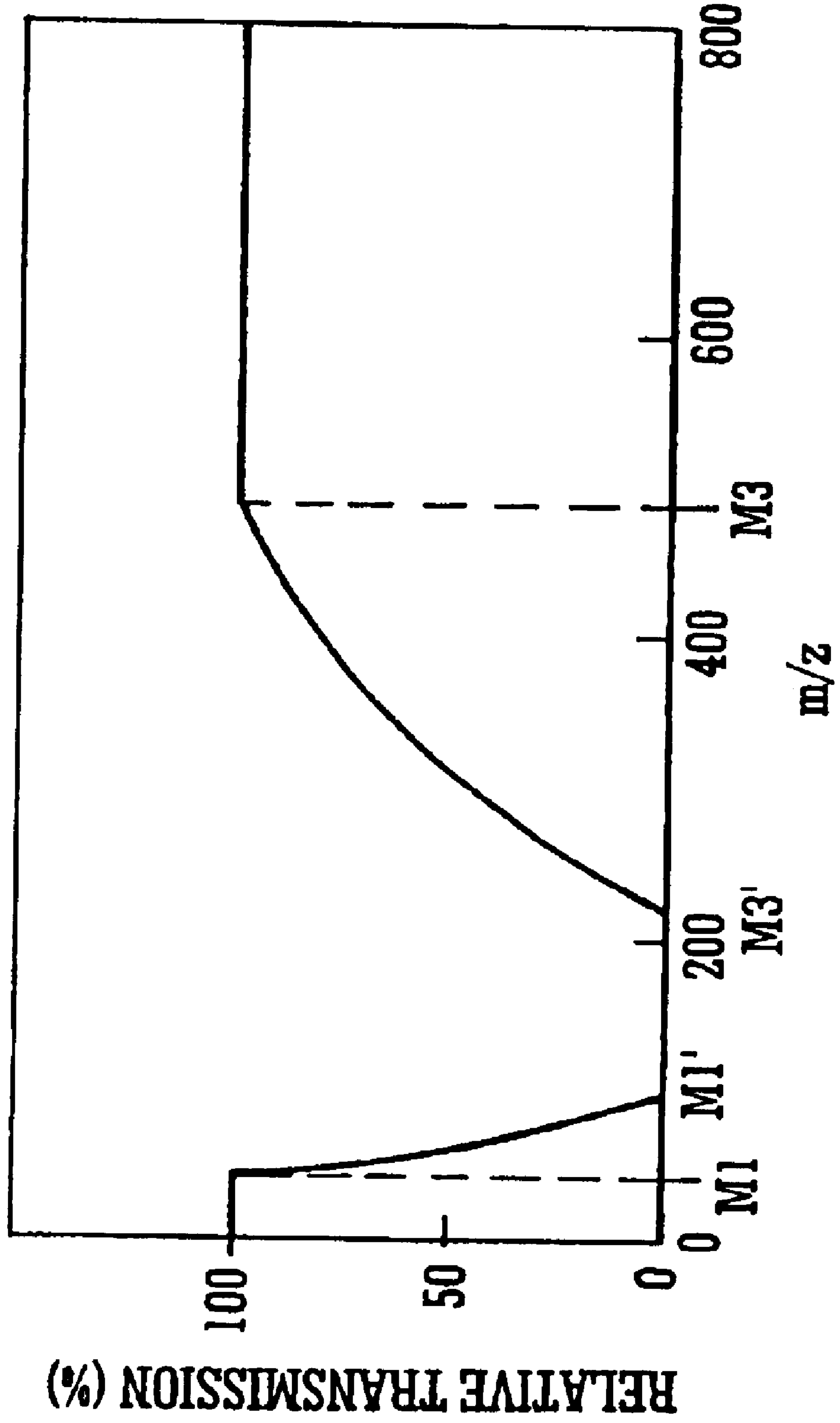
FIG. 12 shows the relative transmission of ions as a function of mass to charge ratio according to a variation of the fourth embodiment.

A variation of the fourth embodiment is contemplated wherein the range of ions not orthogonally accelerated is increased. This can be achieved by increasing the time that the ion gate 2 is closed. This is illustrated further with reference to FIG. 12 which shows the relative transmission as a function of mass to charge ratio according to the variation of the fourth embodiment for an ion energy of 40 eV, $\delta T_3$ of 8.5 μs, delay time $\Delta T_3$ of 6.5 μs and wherein L1 was 60 mm, L2 was 30 mm and L3 was 60 mm. $M_{max}$ was set to 800 daltons. For these values M1 equals 40 daltons, M1' equals 90 daltons, M3' equals 214 daltons and M3 equals 480 daltons. Accordingly, ions having a mass to charge ratio ≦40 daltons are orthogonally accelerated with 100% relative transmission and similarly ions having a mass to charge ratio ≧480 daltons are orthogonally accelerated with 100% relative transmission. Ions having a mass to charge ratio between 90 and 214 daltons are not orthogonally accelerated and ions having a mass to charge ratio between 40 and 90 daltons and between 214 and 480 daltons are orthogonally accelerated with a relative transmission between 0% and 100%.

The mass spectrometer according to the fourth embodiment may be used, for example, with an ICP ion source. An ICP ion source is used for analysis of elements but normally gives rise to a very intense peak at mass to charge ratio 40 due to $Ar^+$ ions from the argon plasma support gas. Therefore, since it may be desired to analyse both relatively low mass atomic ions such as elements from lithium at mass to charge ratio 6 to sulphur at mass to charge ratio 32 and relatively high mass atomic ions such as elements from scandium at mass to charge ratio 45 to uranium and beyond on an orthogonal acceleration Time of Flight mass spectrometer then it would be highly beneficial to use the bandpass filtering mode of operation according to the fourth embodiment wherein the intense argon ions at mass to charge ratio 40 can be effectively filtered out.

Figures 13A, 13B, 13C, 13D:
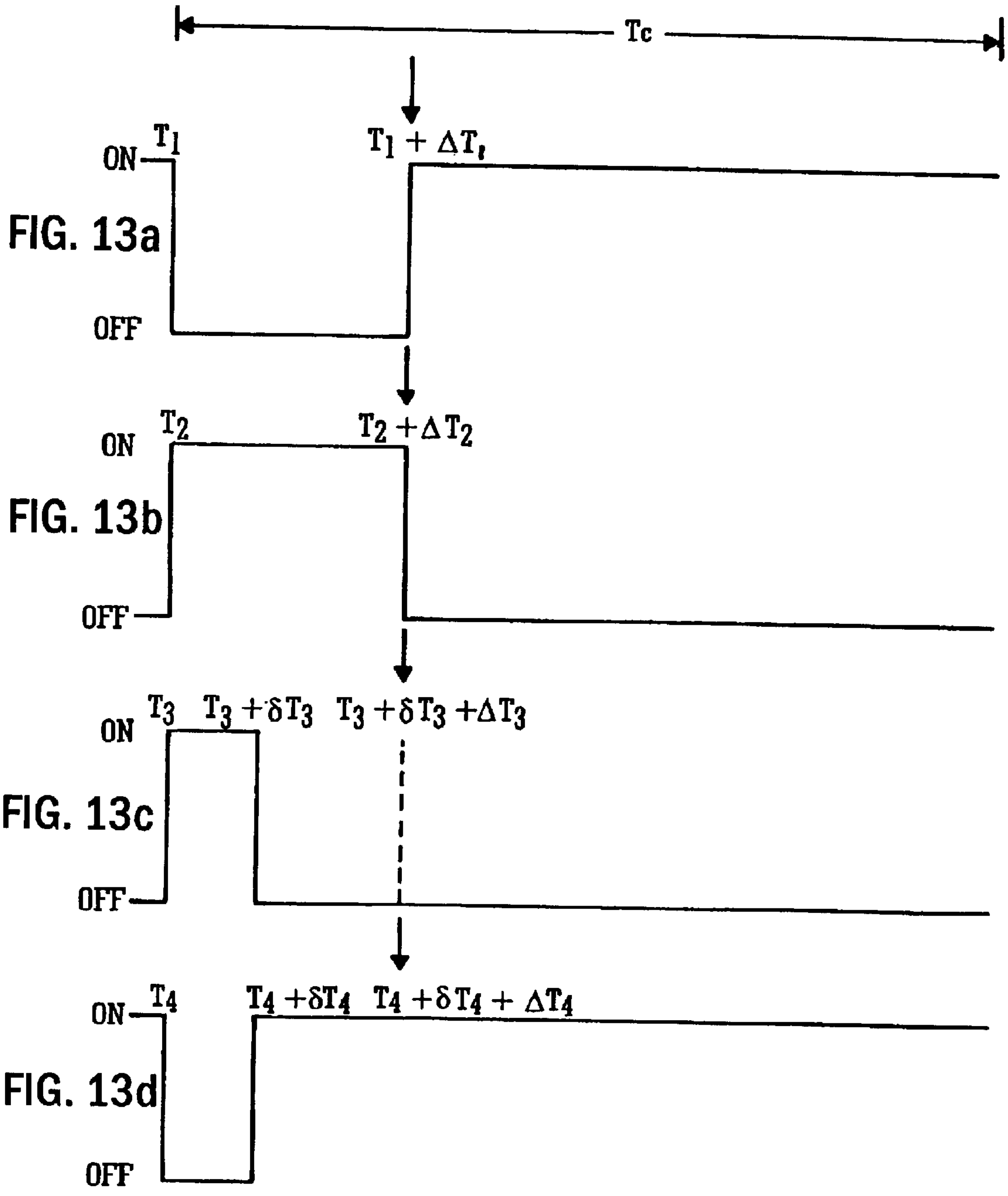
FIG. 13(*a*) shows a timing diagram for the first embodiment.

FIG. 13(*a*) shows a timing diagram for the first embodiment. The ion gate 2 is switched from ON to OFF at time $T_1$ and then after a delay time $\Delta T_1$ the pusher electrode is energised (shown by an arrow) and immediately thereafter the ion gate 2 is switched back from OFF to ON, and remains ON for the rest of the cycle $T_c$.

FIG. 13(*b*) shows a timing diagram for the second embodiment. The ion gate 2 is switched from OFF to ON at time $T_2$ and then after a delay time $\Delta T_2$ the pusher electrode is energised (shown by an arrow) and immediately thereafter the ion gate 2 is switched back from ON to OFF, and remains OFF for the rest of the cycle $T_c$.

FIG. 13(*c*) shows a timing diagram for the third embodiment. The ion gate 2 is switched from OFF to ON at time $T_3$ and remains ON for a time $\delta T_3$. At time $T_3+\delta T_3$ the ion gate 2 is switched back from ON to OFF and then after a delay time $\Delta T_3$ the pusher electrode is energised (shown by an arrow). The ion gate 2 remains OFF for the rest of the cycle $T_c$.

FIG. 13(*d*) shows a timing diagram for the fourth embodiment. The ion gate 2 is switched from ON to OFF at time $T_4$ and remains OFF for a time $\delta T_4$. At time $T_4+\delta T_4$ the ion gate 2 is switched back from OFF to ON and then after a delay time $\Delta T_4$ the pusher electrode is energised (shown by an arrow). The ion gate 2 remains ON for the rest of the cycle $T_c$.

Figure 14A:
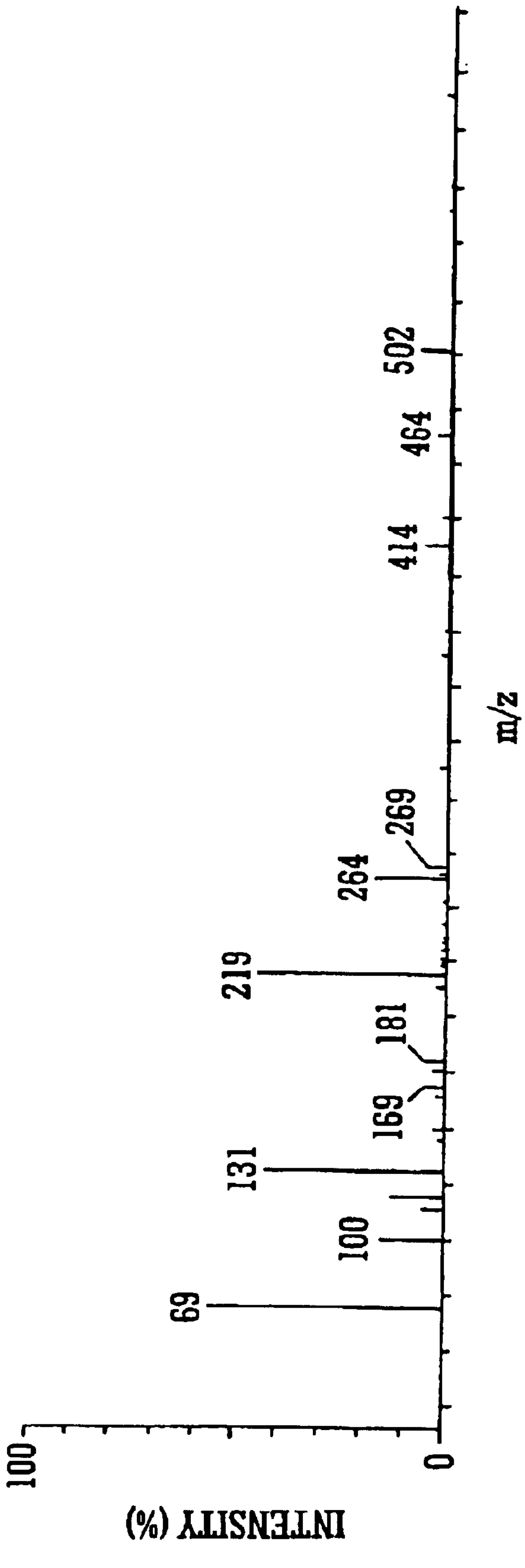
FIG. 14(*a*) shows a mass spectrum obtained according to the first embodiment.
Figure 14B:
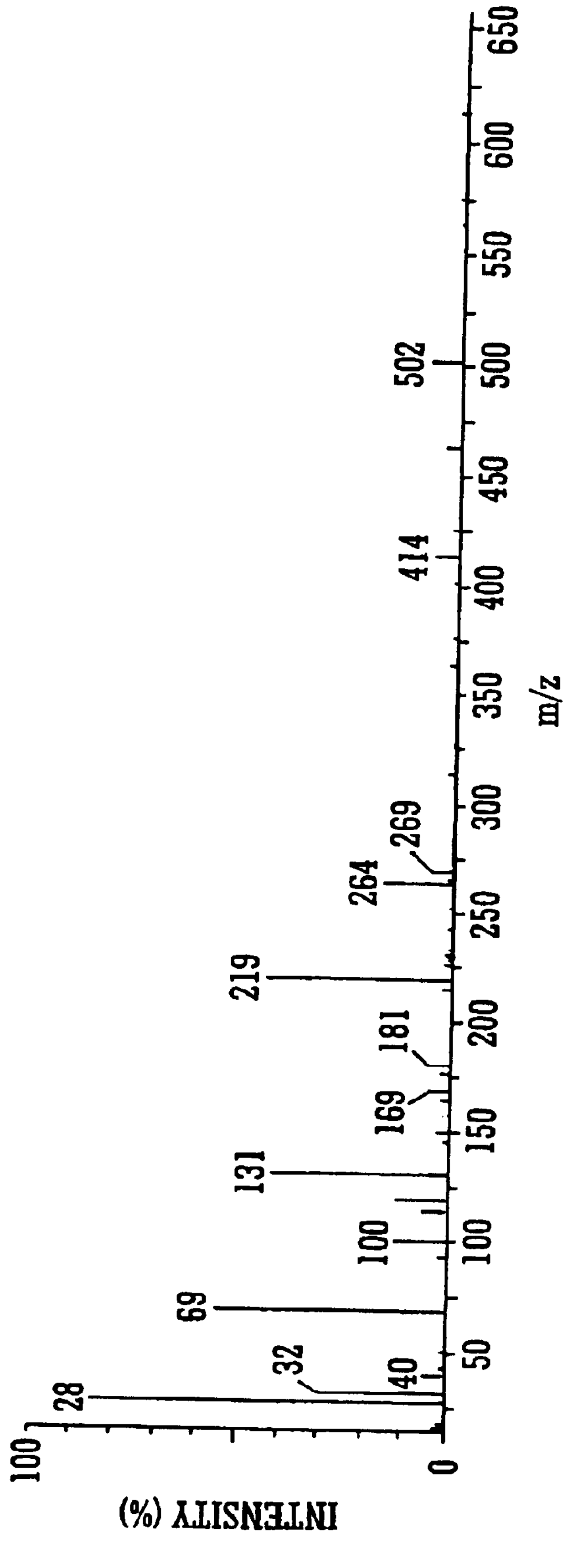

FIG. 14 shows data obtained using an Electron Impact ("EI") ion source and the calibration compound Heptacosa (PFTBA) which was continuously introduced into an orthogonal acceleration Time of Flight mass spectrometer via a septum inlet. FIG. 14(*a*) shows a mass spectrum obtained when using low mass cut-off according to the first embodiment when L1 was 104 mm, L2 was 30 mm and L3 was 71 mm. The ion energy was 43 eV and the delay time $\Delta T_1$ was 9.0 μs. An ion gate voltage of +9V was used. From these values M1 was calculated to be 37 daltons and M1' was calculated to be 62 daltons. FIG. 14(*b*) shows a mass spectrum of Heptacosa (PFTBA) obtained conventionally.

Figures 15A, 15B, 15C:
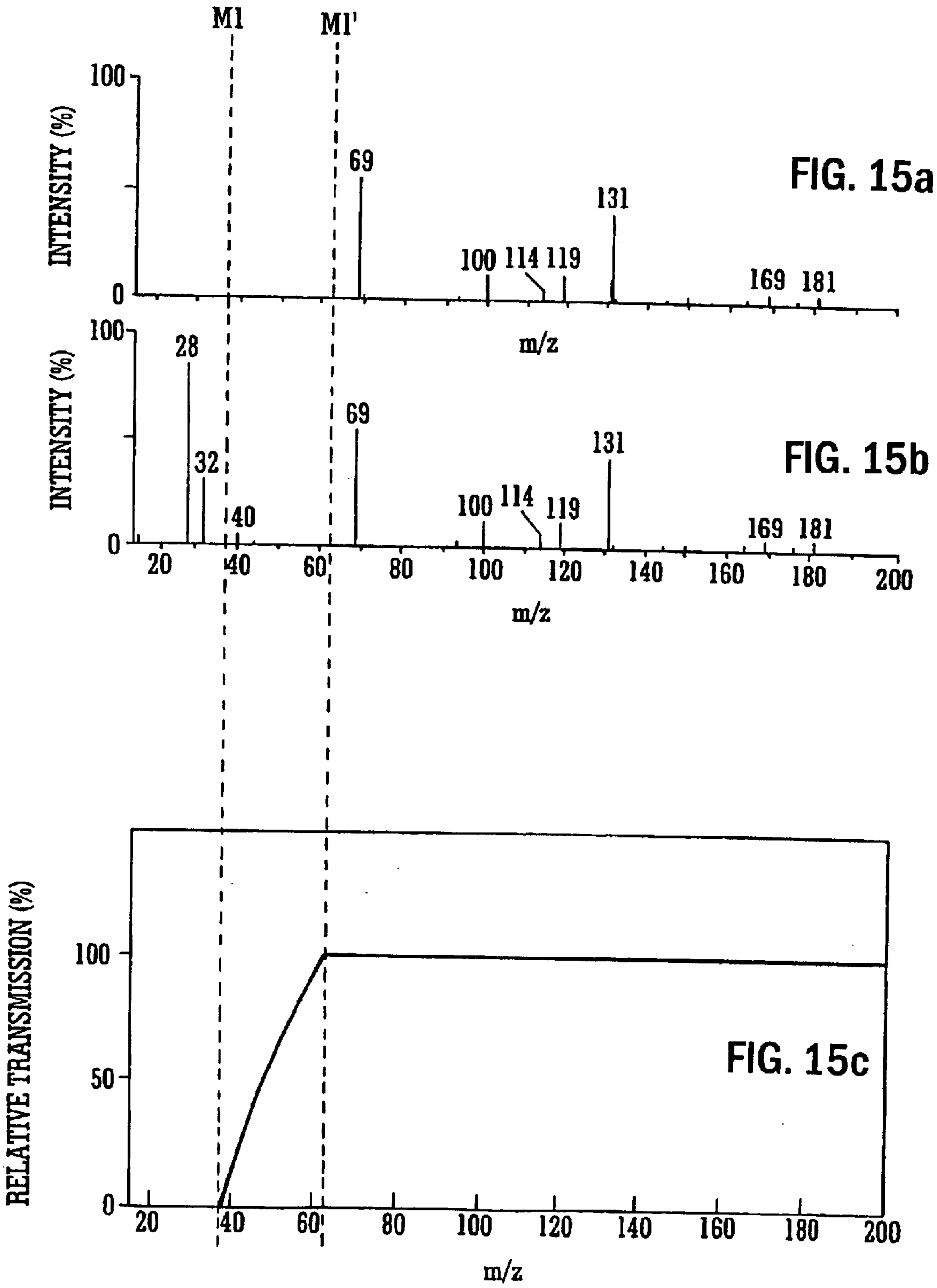
FIG. 15(*a*) shows the same mass spectrum shown in FIG. 14(*a*) but displayed over the reduced mass to charge ratio range 15–200 daltons.

FIG. 15(*a*) shows the same mass spectrum shown in FIG. 14(*a*) but displayed over the reduced mass to charge range 15–200 daltons. FIG. 15(*b*) shows the same mass spectrum shown in FIG. 14(*b*) but displayed over the reduced mass to charge range 15–200 daltons. FIG. 15(*c*) shows the theoretically calculated relative transmission as a function of mass to charge ratio according to the first embodiment. M1 and M1' are indicated by dotted lines on each diagram. It will be observed that there is no loss of intensity for ions of mass to charge ratio >M1' (62 daltons) in the mass spectrum obtained according to the preferred embodiment compared with the mass spectrum obtained according to a conventional arrangement.

Figures 16A, 16B:
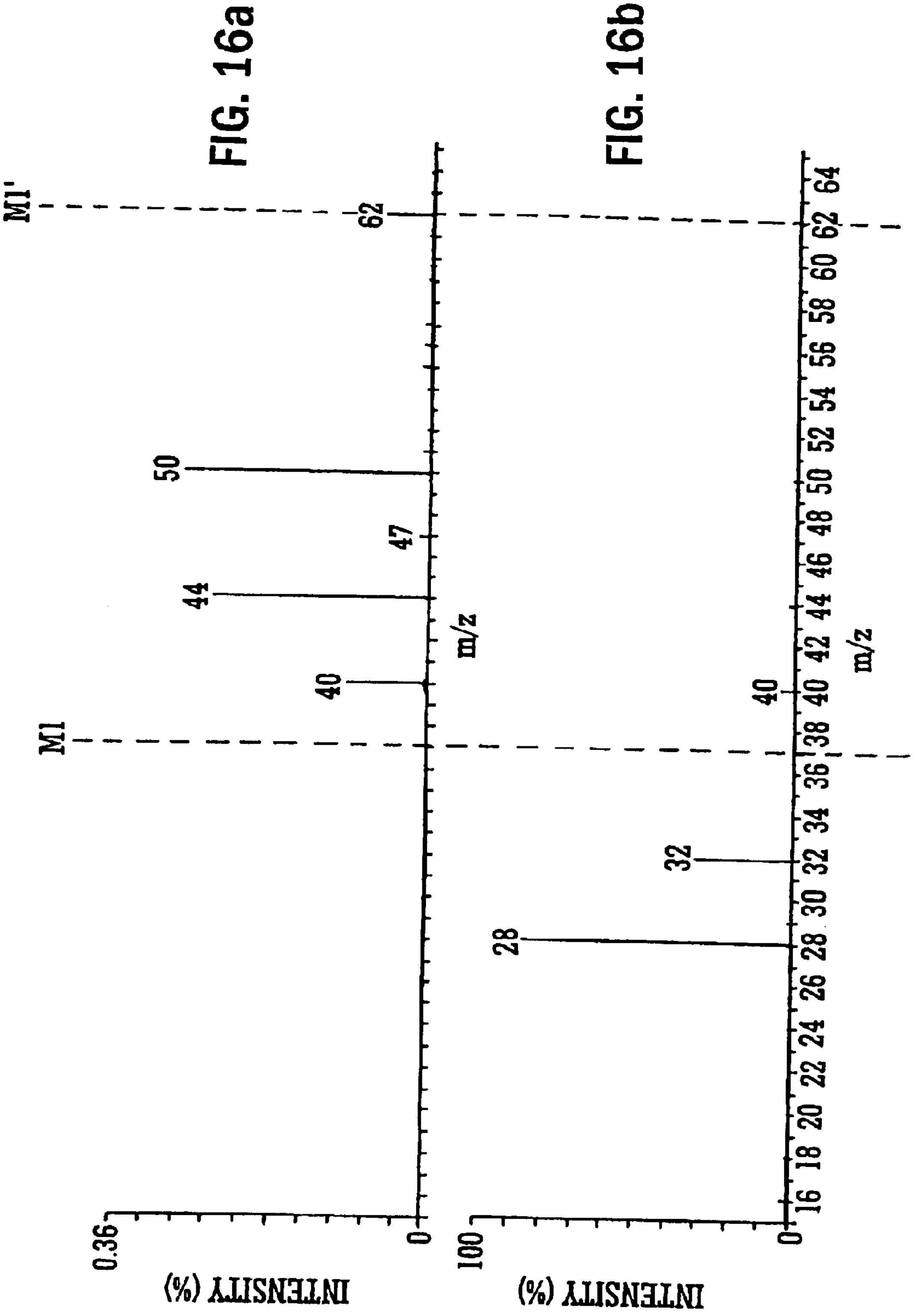
FIG. 16(*a*) shows the same mass spectrum as shown in FIG. 14(*a*) and FIG. 15(*a*) but displayed over the yet further reduced mass to charge ratio range 15–66 daltons with the intensity magnified by a factor of 280.

FIG. 16(*a*) shows the same mass spectrum as shown in FIG. 14(*a*) and FIG. 15(*a*) but displayed over the yet further reduced mass to charge range 15–66 daltons with the intensity magnified by a factor of 280. FIG. 16(*b*) shows the same mass spectrum as shown in FIG. 14(*b*) and FIG. 15(*b*) but displayed over the yet further reduced mass to charge range 15–66 daltons. These Figures illustrate the complete absence of ions having a mass to charge ratio <M1.

Although the present invention has been described with reference to preferred embodiments, it will be understood by those skilled in the art that various changes in form and detail may be made without departing from the scope of the invention as set forth in the accompanying claims.

What is claimed is:

1. A mass spectrometer comprising:

an ion source;

an orthogonal acceleration Time of Flight mass analyser comprising an electrode for orthogonally accelerating ions, an ion detector and a drift region therebetween;

an ion gate upstream of said electrode; and control means for switching said ion gate between a first mode and a second mode, said second mode having a lower ion transmission efficiency than said first mode, wherein in a mode of operation said control means:

(i) switches said ion gate from said first mode to said second mode at a time $T_1$; and (ii) causes said electrode to inject or orthogonally accelerate ions into said drift region at a later time $T_1+\Delta T_1$;

wherein $\Delta T_1$ is set such that ions having a mass to charge ratio ≦ a value M1 are not substantially injected or orthogonally accelerated into said drift region by said electrode.

2. A mass spectrometer as claimed in claim 1, wherein ions having a mass to charge ratio ≧ a value M1' are substantially injected or orthogonally accelerated into said drift region by said electrode with a first transmission efficiency and ions having a mass to charge ratio in the range M1–M1' are substantially injected or orthogonally accelerated into said drift region by said electrode with a second transmission efficiency lower than said first transmission efficiency, wherein M1<M1'.

3. A mass spectrometer as claimed in claim 2, wherein M1' falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

4. A mass spectrometer as claimed in claim 1, wherein $\Delta T_1$ falls within a range selected from the group consisting of: (i) 0.1–1 μs; (ii) 1–5 μs; (iii) 5–10 μs; (iv) 10–15 μs; (v) 15–20 μs; (vi) 20–50 μs; (vii) 50–100 μs; (viii) 100–500 μs; and (ix) 500–1000 μs.

5. A mass spectrometer as claimed in claim 1, wherein M1 falls within a range selected from the group consisting of: (i) 1–5; (ii) 5–10; (iii) 10–15; (iv) 15–20; (v) 20–25; (vi) 25–30; (vii) 30–35; (viii) 35–40; (ix) 40–45; (x) 45–50; (xi) 50–55; (xii) 55–60; (xiii) 60–65; (xiv) 65–70; (xv) 70–75; (xvi) 75–100; (xvii) 100–150; (xviii) 150–200; (xix) 200–250; (xx) 250–300; (xxi) 300–350; (xxii) 350–400; (xxiii) 400–450; (xxiv) 450–500; (xxv) 500–550; (xxvi) 550–600; (xxvii) 600–650; (xxviii) 650–700; (xxix) 700–750; (xxx) 750–800; (xxxi) 800–850; (xxxii) 850–900; (xxxiii) 900–950; (xxxiv) 950–1000; and (xxxv) >1000.

6. A mass spectrometer as claimed in claim 1, wherein M1 is selected from the group consisting of: (i) 4; (ii) 17; (iii) 18; (iv) 28; (v) 29; (vi) 40; (vii) 41; (viii) 93; (ix) 139; (x) 185; (xi) 379; and (xii) 568.

7. A mass spectrometer as claimed in claim 1, wherein immediately after said control means has caused said electrode to inject or orthogonally accelerate ions into said drift region at time $T_1+\Delta T_1$ said control means switches said ion gate from said second mode to said first mode.

8. A mass spectrometer comprising:

an ion source;

an orthogonal acceleration Time of Flight mass analyser comprising an electrode for orthogonally accelerating ions, an ion detector and a drift region therebetween;

an ion gate upstream of said electrode; and control means for switching said ion gate between a first mode and a second mode, said second mode having a lower ion transmission efficiency than said first mode, wherein in a mode of operation said control means:

(i) switches said ion gate from said second mode to said first mode at a time $T_2$; and (ii) causes said electrode to inject or orthogonally accelerate ions into said drift region at a later time $T_2+\Delta T_2$;

wherein $\Delta T_2$ is set such that ions having a mass to charge ratio ≧ a value M3 are not substantially injected or orthogonally accelerated into said drift region by said electrode.

9. A mass spectrometer as claimed in claim 8, wherein ions having a mass to charge ratio ≦ a value M3' are substantially injected or orthogonally accelerated into said drift region by said electrode with a first transmission efficiency and ions having a mass to charge ratio in the range M3'–M3 are substantially injected or orthogonally accelerated into said drift region by said electrode with a second transmission efficiency lower than said first transmission efficiency, wherein M3'<M3.

10. A mass spectrometer as claimed in claim 9, wherein M3' falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

11. A mass spectrometer as claimed in claim 8, wherein $\Delta T_2$ falls within a range selected from the group consisting of: (i) 0.1–1 μs; (ii) 1–5 μs; (iii) 5–10 μs; (iv) 10–15 μs; (v) 15–20 μs; (vi) 20–50 μs; (vii) 50–100 μs; (viii) 100–500 μs; and (ix) 500–1000 μs.

12. A mass spectrometer as claimed in claim 8, wherein M3 falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

13. A mass spectrometer as claimed in claim 8, wherein immediately after said control means has caused said electrode to inject or orthogonally accelerate ions into said drift region at time $T_2+\Delta T_2$ said control means switches said ion gate from said first mode to said second mode.

14. A mass spectrometer comprising:

an ion source;

an orthogonal acceleration Time of Flight mass analyser comprising an electrode for orthogonally accelerating ions, an ion detector and a drift region therebetween;

an ion gate upstream of said electrode; and control means for switching said ion gate between a first mode and a second mode, said second mode having a lower ion transmission efficiency than said first mode, wherein in a mode of operation said control means:

(i) switches said ion gate from said second mode to said first mode at a time $T_3$;

(ii) switches said ion gate from said first mode to said second mode at a later time $T_3+\delta T_3$; and (iii) causes said electrode to inject or orthogonally accelerate ions into said drift region at a yet later time $T_3+\delta T_3+\Delta T_3$;

wherein $\delta T_3$ and $\Delta T_3$ are set such that ions having a mass to charge ratio ≦ a value M1 are not substantially injected or orthogonally accelerated into said drift region by said electrode and such that ions having a mass to charge ratio ≧ a value M3 are not substantially injected or orthogonally accelerated into said drift region by said electrode, wherein M1<M3.

15. A mass spectrometer as claimed in claim 14, wherein ions having a mass to charge ratio M2 are substantially injected or orthogonally accelerated into said drift region by said electrode with a first transmission efficiency and other ions having a mass to charge ratio in the range M1–M3 are substantially injected or orthogonally accelerated into said drift region by said electrode with a second transmission efficiency lower than said first transmission efficiency, wherein M1<M2<M3.

16. A mass spectrometer as claimed in claim 15, wherein M2 falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

17. A mass spectrometer as claimed in claim 14, wherein ions having a mass to charge ratio in a range M1'–M3' are substantially injected or orthogonally accelerated into said drift region by said electrode with a first transmission efficiency and ions having a mass to charge ratio in the range M1–M1' and M3'–M3 are substantially injected or orthogonally accelerated into said drift region by said electrode with a second transmission efficiency lower than said first transmission efficiency, wherein M1<M1'<M3'<M3.

18. A mass spectrometer as claimed in claim 17, wherein M1' falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

19. A mass spectrometer as claimed in claim 17, wherein M3' falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

20. A mass spectrometer as claimed in claim 14, wherein $\delta T_3$ falls within a range selected from the group consisting of: (i) 0.1–1 μs; (ii) 1–5 μs; (iii) 5–10 μs; (iv) 10–15 μs; (v) 15–20 μs; (vi) 20–50 μs; (vii) 50–100 μs; (viii) 100–500 μs; and (ix) 500–1000 μs.

21. A mass spectrometer as claimed in claim 14, wherein $\Delta T_3$ falls within a range selected from the group consisting of: (i) 0.1–1 μs; (ii) 1–5 μs; (iii) 5–10 μs; (iv) 10–15 μs; (v) 15–20 μs; (vi) 20–50 μs; (vii) 50–100 μs; (viii) 100–500 μs; and (ix) 500–1000 μs.

22. A mass spectrometer as claimed in claim 14, wherein M1 falls within a range selected from the group consisting of: (i) 1–5; (ii) 5–10; (iii) 10–15; (iv) 15–20; (v) 20–25; (vi) 25–30; (vii) 30–35; (viii) 35–40; (ix) 40–45; (x) 45–50; (xi) 50–55; (xii) 55–60; (xiii) 60–65; (xiv) 65–70; (xv) 70–75; (xvi) 75–100; (xvii) 100–150; (xviii) 150–200; (xix) 200–250; (xx) 250–300; (xxi) 300–350; (xxii) 350–400; (xxiii) 400–450; (xxiv) 450–500; (xxv) 500–550; (xxvi) 550–600; (xxvii) 600–650; (xxviii) 650–700; (xxix) 700–750; (xxx) 750–800; (xxxi) 800–850; (xxxii) 850–900; (xxxiii) 900–950; (xxxiv) 950–1000; and (xxxv) >1000.

23. A mass spectrometer as claimed in claim 14, wherein M3 falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

24. A mass spectrometer comprising:

an ion source;

an orthogonal acceleration Time of Flight mass analyser comprising an electrode for orthogonally accelerating ions, an ion detector and a drift region therebetween;

an ion gate upstream of said electrode; and control means for switching said ion gate between a first mode and a second mode, said second mode having a lower ion transmission efficiency than said first mode, wherein in a mode of operation said control means:

(i) switches said ion gate from said first mode to said second mode at a time $T_4$;

(ii) switches said ion gate from said second mode to said first mode at a later time $T_4+\delta T_4$; and (iii) causes said electrode to inject or orthogonally accelerate ions into said drift region at a yet later time $T_4+\delta T_4+\Delta T_4$;

wherein $\delta T_4$ and $\Delta T_4$ are set such that ions having a mass to charge ratio equal to a value M2 are not substantially injected or orthogonally accelerated into said drift region by said electrode.

25. A mass spectrometer as claimed in claim 24, wherein M2 falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

26. A mass spectrometer as claimed in claim 24, wherein ions having a mass to charge ratio ≦ a value M1 and ions having a mass to charge ratio ≧ a value M3 are substantially injected or orthogonally accelerated into said drift region by said electrode with a first transmission efficiency, and wherein ions having a mass to charge in the range M1–M3 are substantially injected or orthogonally accelerated into said drift region by said electrode with a second transmission efficiency lower than said first transmission efficiency, wherein M1<M2<M3.

27. A mass spectrometer comprising:

an ion source;

an orthogonal acceleration Time of Flight mass analyser comprising an electrode for orthogonally accelerating ions, an ion detector and a drift region therebetween;

an ion gate upstream of said electrode; and control means for switching said ion gate between a first mode and a second mode, said second mode having a lower ion transmission efficiency than said first mode, wherein in a mode of operation said control means:

(i) switches said ion gate from said first mode to said second mode at a time $T_4$;

(ii) switches said ion gate from said second mode to said first mode at a later time $T_4+\delta T_4$; and (iii) causes said electrode to inject or orthogonally accelerate ions into said drift region at a yet later time $T_4+\delta T_4+\Delta T_4$;

wherein $\delta T_4$ and $\Delta T_4$ are set such that ions having a mass to charge ratio in a range M1'–M3' are not substantially injected or orthogonally accelerated into said drift region by said electrode, wherein M1'<M3'.

28. A mass spectrometer as claimed in claim 27, wherein M1' falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

29. A mass spectrometer as claimed in claim 27, wherein M3' falls within a range selected from the group consisting of: (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

30. A mass spectrometer as claimed in claim 27, wherein ions having a mass to charge ratio ≦ a value M1 and ions having a mass to charge ratio ≧ a value M3 are substantially injected or orthogonally accelerated into said drift region by said electrode with a first transmission efficiency and ions having a mass to charge ratio in the range M1–M1' and ions having a mass to charge ratio in the range M3'–M3 are substantially injected or orthogonally accelerated into said drift region by said electrode with a second transmission efficiency lower than said first transmission efficiency, wherein M1<M1'<M3'<M3.

31. A mass spectrometer as claimed in claim 30, wherein M1 falls within a range selected from the group consisting of: (i) 1–5; (ii) 5–10; (iii) 10–15; (iv) 15–20; (v) 20–25; (vi) 25–30; (vii) 30–35; (viii) 35–40; (ix) 40–45; (x) 45–50; (xi) 50–55; (xii) 55–60; (xiii) 60–65; (xiv) 65–70; (xv) 70–75; (xvi) 75–100; (xvii) 100–150; (xviii) 150–200; (xix) 200–250; (xx) 250–300; (xxi) 300–350; (xxii) 350–400; (xxiii) 400–450; (xxiv) 450–500; (xxv) 500–550; (xxvi) 550–600; (xxvii) 600–650; (xxviii) 650–700; (xxix) 700–750; (xxx) 750–800; (xxxi) 800–850; (xxxii) 850–900; (xxxiii) 900–950; (xxxiv) 950–1000; and (xxxv) >1000.

32. A mass spectrometer as claimed in claim 30, wherein M3 falls within a range selected from the group consisting of (i) 1–50; (ii) 50–100; (iii) 100–150; (iv) 150–200; (v) 200–250; (vi) 250–300; (vii) 300–350; (viii) 350–400; (ix) 400–450; (x) 450–500; (xi) 500–550; (xii) 550–600; (xiii) 600–650; (xiv) 650–700; (xv) 700–750; (xvi) 750–800; (xvii) 800–850; (xviii) 850–900; (xix) 900–950; (xx) 950–1000; (xxi) 1000–1500; (xxii) 1500–2000; (xxiii) 2000–2500; (xxiv) 2500–3000; and (xxv) >3000.

33. A mass spectrometer as claimed in claim 27, wherein $\delta T_4$ falls within a range selected from the group consisting of: (i) 0.1–1 μs; (ii) 1–5 μs; (iii) 5–10 μs; (iv) 10–15 μs; (v) 15–20 μs; (vi) 20–50 μs; (vii) 50–100 μs; (viii) 100–500 μs; and (ix) 500–1000 μs.

34. A mass spectrometer as claimed in claim 27, wherein $\Delta T_4$ falls within a range selected from the group consisting of: (i) 0.1–1 μs; (ii) 1–5 μs; (iii) 5–10 μs; (iv) 10–15 μs; (v) 15–20 μs; (vi) 20–50 μs; (vii) 50–100 μs; (viii) 100–500 μs; and (ix) 500–1000 μs.

35. A mass spectrometer as claimed in claim 27, wherein said electrode comprises a pusher and/or puller electrode.

36. A mass spectrometer as claimed in claim 27, wherein said ion gate comprises one or more electrodes for altering, deflecting, reflecting, defocusing, attenuating or blocking a beam of ions.

37. A mass spectrometer as claimed in claim 27, wherein in said second mode said ion transmission efficiency is substantially 0%.

38. A mass spectrometer as claimed in claim 27, wherein in said second mode said ion transmission efficiency is ≦x% of the ion transmission efficiency in said first mode, wherein x falls within a range selected from the group consisting of; (i) 0.001–0.01; (ii) 0.01–0.1; (iii) 0.1–1 (iv) 1–10; and (v) 10–90.

39. A mass spectrometer as claimed in claim 27, wherein said electrode is repeatedly energised with a frequency selected from the group consisting of: (i) 100–500 Hz; (ii) 0.5–1 kHz; (iii) 1–5 kHz; (iv) 5–10 kHz; (v) 10–20 kHz; (vi) 20–30 kHz; (vii) 30–40 kHz; (viii) 40–50 kHz; (ix) 50–60 kHz; (x) 60–70 kHz; (xi) 70–80 kHz; (xii) 80–90 kHz; (xiii) 90–100 kHz; (xiv) 100–500 kHz; (xv) 0.5–1 MHz; and (xvi) >1 MHz.

40. A mass spectrometer as claimed in claim 27, wherein said ion source comprises a continuous ion source.

41. A mass spectrometer as claimed in claim 40, wherein said ion source is selected from the group consisting of: (i) an Electron Impact ("EI") ion source; (ii) a Chemical Ionisation ("CI") ion source; (iii) a Field Ionisation ("FI") ion source; (iv) an Electrospray ion source; (v) an Atmospheric Pressure Chemical Ionisation ("APCI") ion source; (vi) an Inductively Coupled Plasma ("ICP") ion source; (vii) an Atmospheric Pressure Photo Ionisation ("APPI") ion source; (viii) a Fast Atom Bombardment ("FAB") ion source; and (ix) a Liquid Secondary Ions Mass Spectrometry ("LSIMS") ion source.

42. A mass spectrometer as claimed in claim 27, wherein said ion source is a pseudo-continuous ion source.

43. A mass spectrometer as claimed in claim 42, wherein said ion source is selected from the group consisting of: (i) a Matrix Assisted Laser Desorption Ionisation ("MALDI") ion source; and (ii) a Laser Desorption Ionisation ("LDI") ion source.

44. A mass spectrometer as claimed in claim 43, further comprising an RF ion guide comprising a collision gas for dispersing a packet of ions emitted by said ion source.

45. A mass spectrometer as claimed in claim 27, wherein said ion source is coupled to a liquid chromatography source.

46. A mass spectrometer as claimed in claim 27, wherein said ion source is coupled to a gas chromatography source.

47. A method of mass spectrometry, comprising:

switching an ion gate from a first mode to a second mode at a tune $T_1$, said second mode having a lower ion transmission efficiency than said first mode; and injecting or orthogonally accelerating ions into a drift region of an orthogonal acceleration Time of Flight mass analyser at a later time $T_1+\Delta T_1$;

wherein $\Delta T_1$ is set such that ions having a mass to charge ratio $\leqq$ a value M1 are not substantially injected or orthogonally accelerated into said drift region.

48. A method of mass spectrometry, comprising:

switching an ion gate from a second mode to a first mode at a time $T_2$, said second mode having a lower ion transmission efficiency than said first mode; and injecting or orthogonally accelerating ions into a drift region of an orthogonal acceleration Time of Flight mass analyser at a later time $T_2+\Delta T_2$;

wherein $\Delta T_2$ is set such that ions having a mass to charge ratio $\geqq$ a value M3 are not substantially injected or orthogonally accelerated into said drift region.

49. A method of mass spectrometry, comprising:

switching an ion gate from a second mode to a first mode at a time $T_3$, said second mode having a lower ion transmission efficiency than said first mode;

switching said ion gate from said first mode to said second mode at a later time $T_3+\delta T_3$; and injecting or orthogonally accelerating ions into a drift region of an orthogonal acceleration Time of Flight mass analyser at a yet later time $T_3+\delta T_3+\Delta T_3$;

wherein $\delta T_3$ and $\Delta T_3$ are set such that ions having a mass to charge ratio $\leqq$ a value M1 are not substantially injected or orthogonally accelerated into said drift region and such that ions having a mass to charge ratio $\geqq$ a value M3 are not substantially injected or orthogonally accelerated into said drift region, wherein M1<M3.

50. A method of mass spectrometry, comprising:

switching an ion gate from a first mode to a second mode at a time $T_4$, said second mode having a lower ion transmission efficiency than said first mode;

switching said ion gate from said second mode to said first mode at a later time $T_4+\delta T_4$; and injecting or orthogonally accelerating ions into a drift region of an orthogonal acceleration Time of Flight mass analyser at a yet later time $T_4+\delta T_4+\Delta T_4$;

wherein $\delta T_4$ and $\Delta T_4$ are set such that ions having a mass to charge ratio equal to a value M2 are not substantially injected or orthogonally accelerated into said drift region.

51. A method of mass spectrometry, comprising:

switching an ion gate from a first mode to a second mode at a time $T_4$, said second mode having a lower ion transmission efficiency than said first mode;

switching said ion gate from said second mode to said first mode at a later time $T_4+\delta T_4$; and injecting or orthogonally accelerating ions into a drift region of an orthogonal acceleration Time of Flight mass analyser at a yet later time $T_4+\delta T_4+\Delta T_4$;

wherein $\delta T_4$ and $\Delta T_4$ are set such that ions having a mass to charge ratio in a range M1'–M3' are not substantially injected or orthogonally accelerated into said drift region, wherein M1'<M3'.

* * * * *